(12) United States Patent
Hattori

(10) Patent No.: US 10,863,192 B2
(45) Date of Patent: *Dec. 8, 2020

(54) IMAGE CODING APPARATUS, IMAGE CODING METHOD, IMAGE DECODING APPARATUS, IMAGE DECODING METHOD, AND STORAGE MEDIUM

(71) Applicant: CANON KABUSHIKI KAISHA, Tokyo (JP)

(72) Inventor: Hideaki Hattori, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/419,909

(22) Filed: May 22, 2019

(65) Prior Publication Data

US 2019/0273941 A1 Sep. 5, 2019

Related U.S. Application Data

(63) Continuation of application No. 14/359,263, filed as application No. PCT/JP2012/079589 on Nov. 8, 2012, now Pat. No. 10,349,077.

(30) Foreign Application Priority Data

Nov. 21, 2011 (JP) .................................. 2011-254194

(51) Int. Cl.
| | |
|---|---|
| *H04N 19/52* | (2014.01) |
| *H04N 19/70* | (2014.01) |
| *H04N 19/17* | (2014.01) |
| *H04N 19/176* | (2014.01) |

(52) U.S. Cl.
CPC ............. *H04N 19/52* (2014.11); *H04N 19/17* (2014.11); *H04N 19/176* (2014.11); *H04N 19/70* (2014.11)

(58) Field of Classification Search
CPC ...... H04N 19/52; H04N 19/176; H04N 19/70; H04N 19/17; H04N 19/162; H04N 19/44
USPC ...................................................... 375/240.24
See application file for complete search history.

(56) References Cited

U.S. PATENT DOCUMENTS

| | | | | |
|---|---|---|---|---|
| 5,881,176 A | * | 3/1999 | Keith .................... | G06F 17/148 375/E7.016 |
| 5,966,465 A | * | 10/1999 | Keith .................... | G06F 17/148 375/E7.016 |
| 6,757,437 B1 | * | 6/2004 | Keith .................... | G06F 17/148 375/E7.016 |

(Continued)

*Primary Examiner* — Tung T Vo
(74) *Attorney, Agent, or Firm* — Canon U.S.A., Inc. IP Division

(57) ABSTRACT

An image coding apparatus which divides each of one or more image frames into a plurality of rectangular tiles according to a predetermined tile division method and encodes each tile, the image coding apparatus includes an input unit configured to input from outside, tile division information indicating a divided state of the tiles and a preview area to be used in a preview in which an image is displayed in a smaller size as compared to a size of the frame, a determination unit configured to determine from the tile division information and the preview area to be used in the preview, preview tile to be used in a preview, a generation unit configured to generate tile preview information including identification information of tiles corresponding to the determined preview tile.

1 Claim, 18 Drawing Sheets

(56) References Cited

U.S. PATENT DOCUMENTS

| | | | | |
|---|---|---|---|---|
| 8,270,469 B2* | 9/2012 | Chui | H04N 19/159 | 375/240.01 |
| 8,335,996 B2* | 12/2012 | Davidson | G06F 3/0481 | 715/799 |
| 8,754,827 B2* | 6/2014 | Braghis | G06F 3/1454 | 345/1.3 |
| 9,264,471 B2* | 2/2016 | Pichumani | H04L 65/4076 | |
| 9,286,657 B1* | 3/2016 | Thorup, Jr. | G06T 5/00 | |
| 10,212,491 B2* | 2/2019 | Denoual | H04N 19/70 | |
| 10,349,077 B2* | 7/2019 | Hattori | | |
| 2003/0007561 A1* | 1/2003 | Kajiwara | H04N 19/176 | 375/240.11 |
| 2003/0068089 A1* | 4/2003 | Sano | G06T 9/007 | 382/232 |
| 2003/0142872 A1* | 7/2003 | Koyanagi | H04N 21/234327 | 382/236 |
| 2004/0165789 A1* | 8/2004 | Ii | H04N 19/176 | 382/299 |
| 2005/0129322 A1* | 6/2005 | Olin | H04N 19/63 | 382/240 |
| 2006/0104523 A1* | 5/2006 | Suzuki | H04N 5/23216 | 382/232 |
| 2007/0230658 A1* | 10/2007 | Okada | H04N 19/105 | 378/57 |
| 2008/0127258 A1* | 5/2008 | Walker | H04N 7/163 | 725/39 |
| 2008/0159639 A1* | 7/2008 | Dvir | H04N 19/176 | 382/236 |
| 2009/0016622 A1* | 1/2009 | Itakura | H04N 21/2662 | 382/236 |
| 2010/0046631 A1* | 2/2010 | Raveendran | H04N 21/4348 | 375/240.25 |
| 2010/0046637 A1* | 2/2010 | Raveendran | H04N 21/4348 | 375/240.26 |
| 2010/0232504 A1* | 9/2010 | Feng | H04N 19/176 | 375/240.13 |
| 2011/0032430 A1* | 2/2011 | Prieto | G09G 3/3406 | 348/687 |
| 2012/0230428 A1* | 9/2012 | Segall | H04N 19/176 | 375/240.25 |
| 2013/0057549 A1* | 3/2013 | Beaver, III | G06T 19/00 | 345/420 |
| 2013/0101035 A1* | 4/2013 | Wang | H04N 19/70 | 375/240.12 |
| 2017/0201750 A1* | 7/2017 | Komiya | H04N 19/46 | |

\* cited by examiner

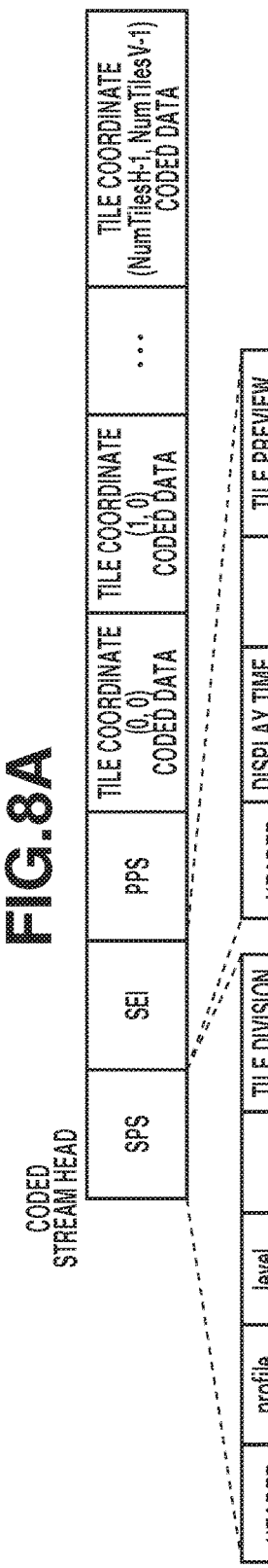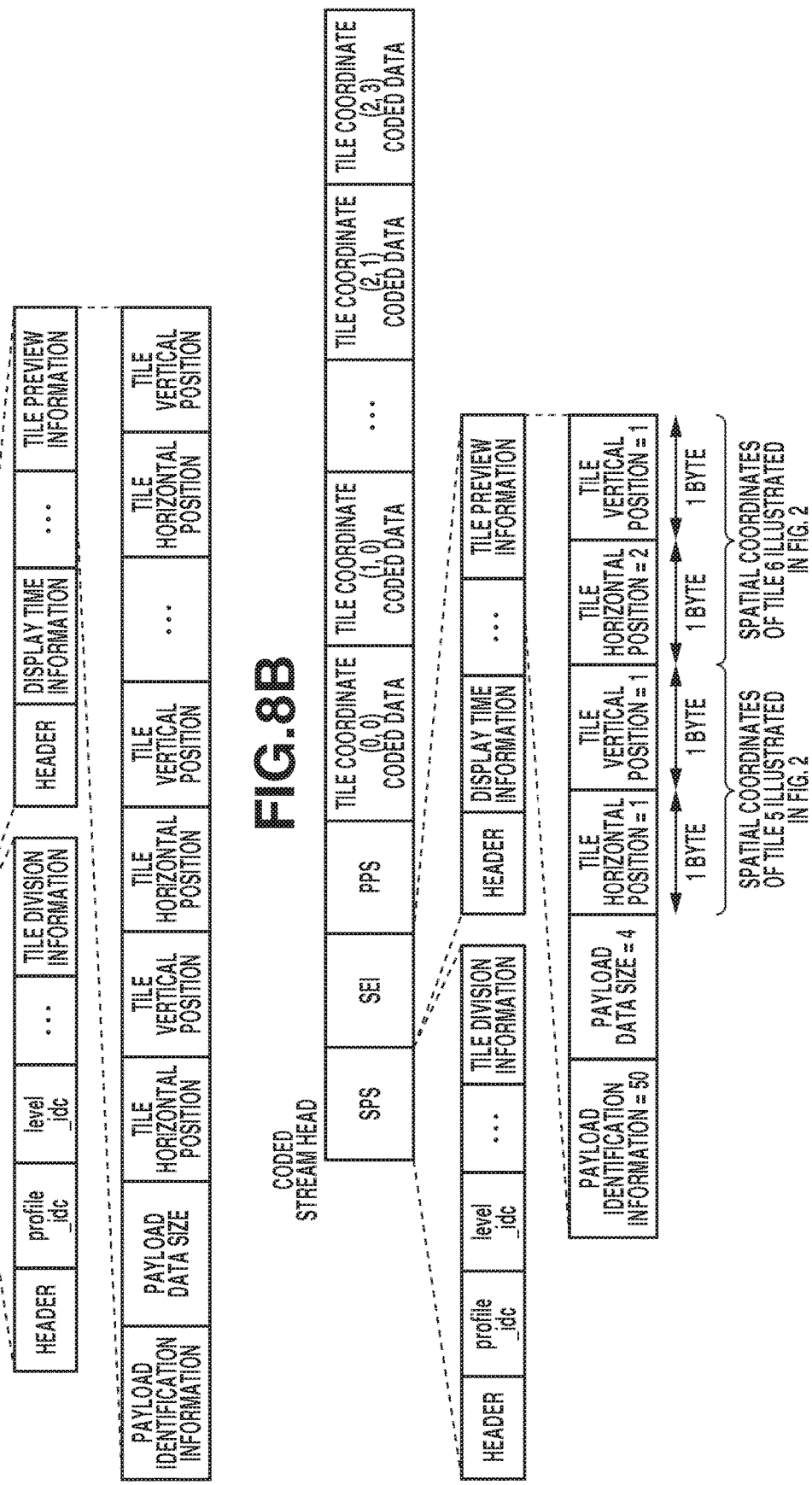

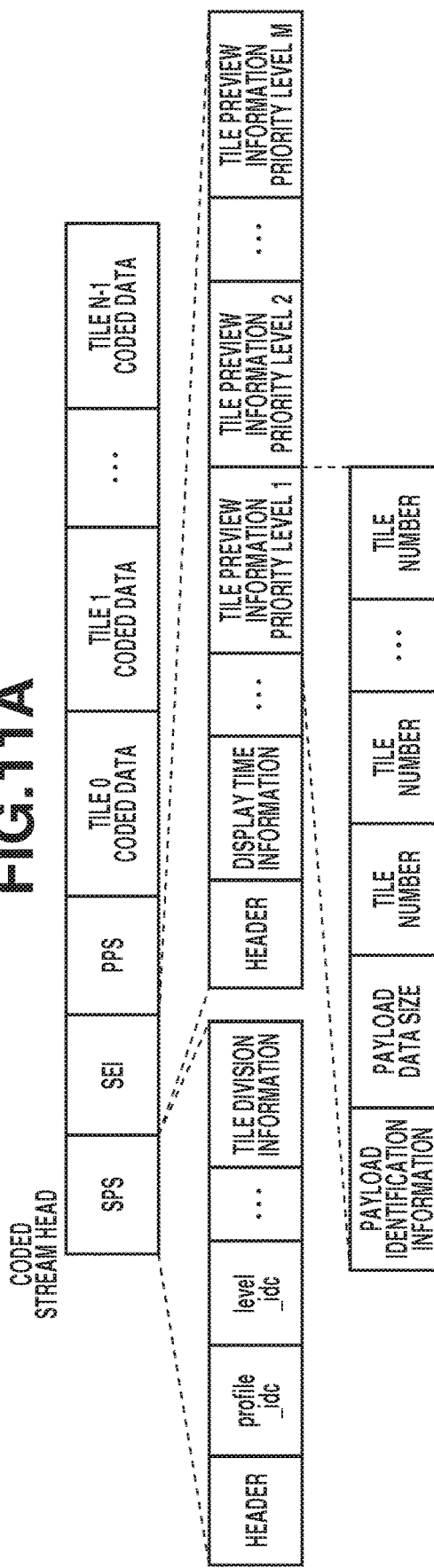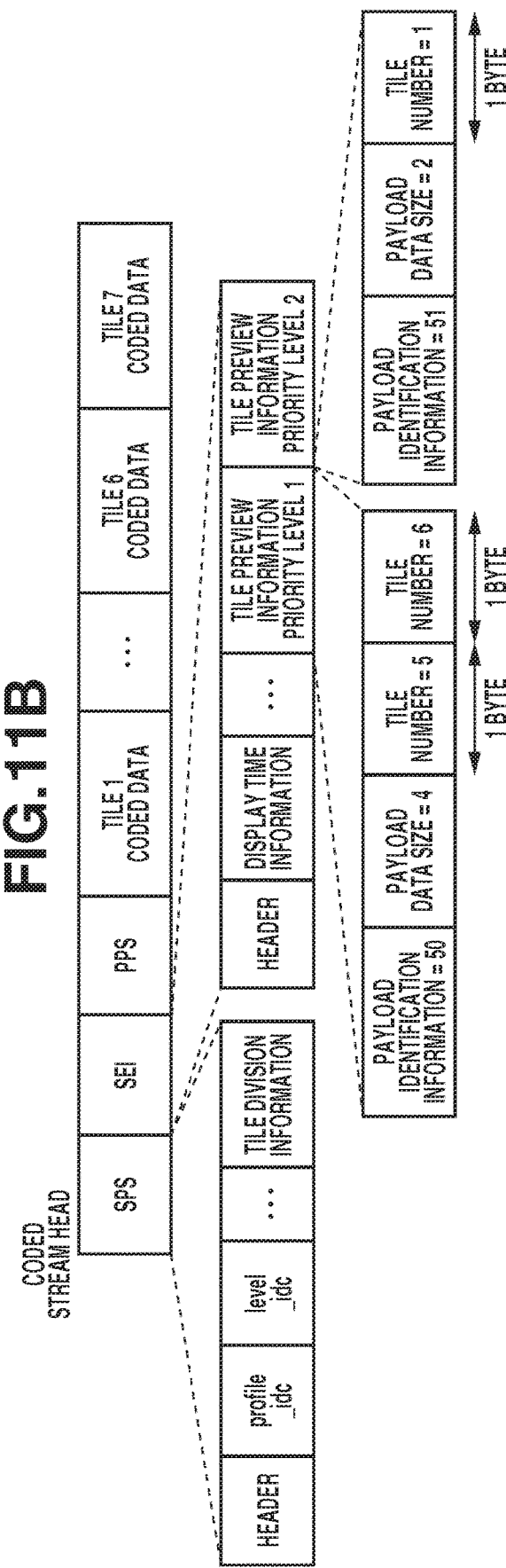

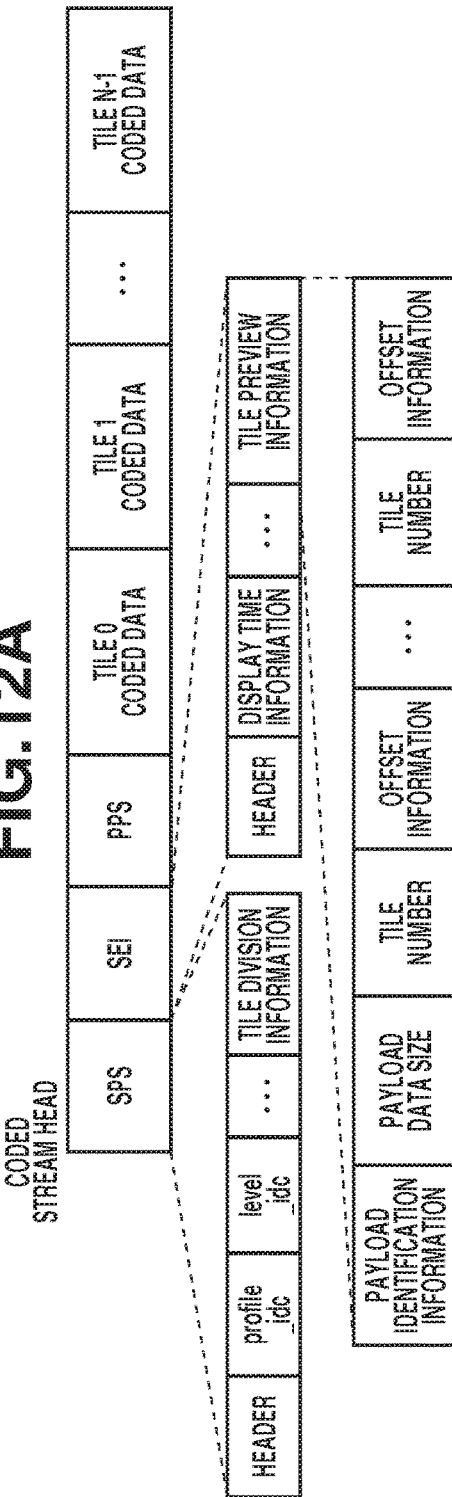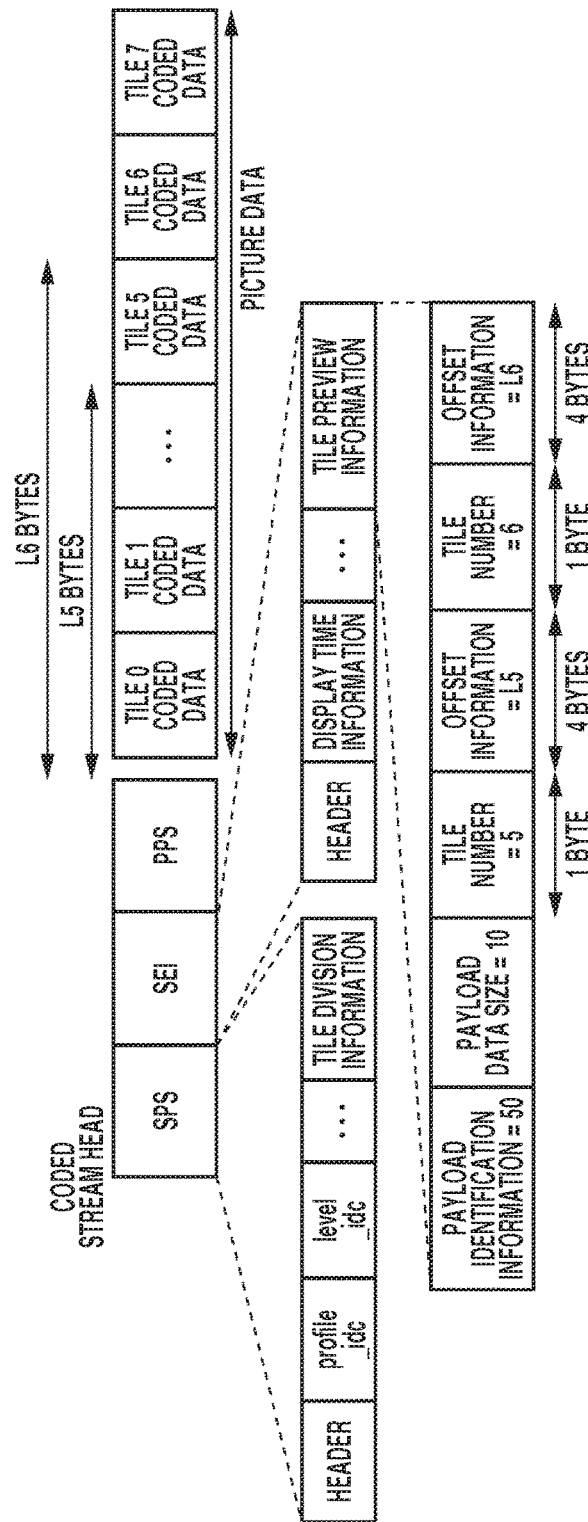

IMAGE CODING APPARATUS, IMAGE CODING METHOD, IMAGE DECODING APPARATUS, IMAGE DECODING METHOD, AND STORAGE MEDIUM

CROSS REFERENCE TO RELATED APPLICATIONS

This application is a continuation of U.S. patent application Ser. No. 14/359,263, filed on May 19, 2014, that is a national phase application of international patent application PCT/JP2012/079589 filed on Nov. 8, 2012, and claims the benefit of, and priority to, Japanese Patent Application No. 2011-254194, filed Nov. 21, 2011, which are hereby incorporated by reference herein in their entireties.

TECHNICAL FIELD

The present invention relates to an image coding apparatus, an image coding method, an image decoding apparatus, an image decoding method, and a storage medium. In particular, the present invention relates to methods for coding and decoding an image in which each frame has been divided into rectangular tiles.

BACKGROUND ART

Recently, development in the digital technology has lead to popularization of capturing high-resolution digital moving images using digital cameras and digital video cameras. In general, the digital moving image is compressed (encoded) to be efficiently recorded in a recording medium such as a flash memory. A widely-used coding method for the moving image is H.264/MPEG-4 Advanced Video Coding (AVC), i.e., H.264 (refer to NPL 1).

Recently, activities have been started for internationally standardizing a successor coding method of H.264 having higher efficiency. More specifically, Joint Collaboration Team on Video Coding (JCT-VC) has been established between ISO/IEC and ITU-T. JCT-VC is developing High Efficiency Video Coding (HEVC) as a standard.

In standardizing HEVC, various coding methods are being discussed in terms of simplifying implementation and shortening processing time, in addition to improving the coding efficiency. One of such methods is referred to as a Tile technique which divides one frame into a plurality of rectangular regions, so that coding and decoding can be performed in parallel (refer to NPL 2).

By employing the Tile technique and performing parallel processing of coding and decoding, high speed processing can be realized, and memory capacities of the image coding apparatus and the image decoding apparatus can be reduced. Further, the Tile technique is also employed in a JPEG 2000 coding method (refer to ITU-T T.800 (08/2002) JPEG 2000 Image Coding System: Core coding system).

Furthermore, a preview (or a thumbnail) function of still image and moving image contents is widely used so that a user can easily recognize the content of the digital image. The preview usually uses a reduced image of the entire frame.

However, in recent years, the numbers of pixels in still images and moving images have increased. It is thus desirable that a mode which realizes the detailed display of only a portion of the content as a Region-of-Interest (ROI) is usable. More specifically, since the content cannot be sufficiently expressed in detail on a screen of a limited display size, e.g., in a mobile terminal, such a mode is desirable.

Further, important information (e.g., a main object such as a person) in the content captured at a wide angle may exist in a region corresponding to only a portion of the frame. In such a case, it is desirable to enlarge the important information and perform high-definition display as the preview.

Furthermore, it is desirable that the preview is processed at maximum speed in terms of user-friendliness. It is thus desirable to decode only the tiles corresponding to the portion of the frame to perform high-speed processing, and display as the preview.

In other words, the decoding time is greatly shortened by decoding only the tiles, as compared to decoding the entire frame of the still image or the moving image and displaying the preview. According to the present exemplary embodiment, the tiles displayed in previewing will be hereinafter referred to as preview tile.

PTL 1 discusses a technique which decodes, when displaying a portion of the frame, up to a high frequency component of the tiles to be displayed, and displaying a high image quality preview.

However, the technique discussed in PTL 1, i.e., the Tile technique in HEVC, does not include an image coding format (hereinafter referred to as a coding format) in which the preview tile is determined among the tiles in the frame. More specifically, when the tiles corresponding to a portion of the frame are displayed as the preview, the tiles in a compressed coded stream to be used for displaying the preview are not defined.

If the tiles corresponding to only a portion of the frame are to be displayed as the preview as described above, it is necessary for the decoding apparatus or a decoding program to independently determine the tiles to be used. As a result, the content of the preview may become different between the decoding apparatus and the decoding program.

Further, when a content creator displays a portion of the frame as the preview, it is desirable for the content creator to designate the content of the preview. If the preview is appropriately designated, a viewer of the content becomes capable of selecting and searching the content without hesitation.

However, the content creator cannot designate the preview tile using the coding format in the technique discussed in PTL 1. Further, if the information on the tiles to be used as the preview is included as user data in the coded stream, the decoding apparatus and the decoding program independently determine whether to use the user data, so that the desired preview may not be acquired.

Furthermore, the technique discussed in PTL 1 is the decoding method of the tiles used for displaying a display region at higher image quality when the region to be displayed is predetermined. The method is thus not a method for designating the tiles to be displayed when performing previewing.

PATENT LITERATURE

PTL 1
Japanese Patent Application Laid-Open No. 2004-226908

Non Patent Literature

NPL 1
ITU-T H.264 (03/2010) Advance video coding for generic audio visual services

NPL 2

JCT-VC contributed article JCTVC-F335.doc Internet <http://phenix.int-evry.fr/jct/doc_end_user/documents/6_Torino/wgll/>

SUMMARY OF INVENTION

The present invention is directed to a method for decoding, when performing previewing by displaying only a region corresponding to a portion of the moving image or the still image, appropriate tiles. Further, the present invention is directed to a method for providing the preview content desired by the content creator.

Solution to Problem

According to an aspect of the present invention, an image coding apparatus which divides each of one or more image frames into a plurality of rectangular tiles according to a predetermined tile division method and encodes each tile, the image coding apparatus includes an input unit configured to input from outside, tile division information indicating a divided state of the tiles and a preview area to be used in a preview in which an image is displayed in a smaller size as compared to a size of the frame, a determination unit configured to determine from the tile division information and the preview area to be used in the preview, preview tile to be used in a preview, a generation unit configured to generate tile preview information including identification information of tiles corresponding to the determined preview tile, and a coding unit configured to multiplex the tile division information and the tile preview information into a coded stream and perform coding.

Further features and aspects of the present invention will become apparent from the following detailed description of exemplary embodiments with reference to the attached drawings.

BRIEF DESCRIPTION OF DRAWINGS

The accompanying drawings, which are incorporated in and constitute a part of the specification, illustrate exemplary embodiments, features, and aspects of the invention and, together with the description, serve to explain the principles of the invention.

FIGS. 8A and 8B illustrate a coding format and a coded stream according to the third exemplary embodiment of the present invention.

FIGS. 11A and 11B illustrate a coding format and a coded stream according to the fifth exemplary embodiment of the present invention.

FIGS. 12A and 12B illustrate a coding format and a coded stream according to a sixth exemplary embodiment of the present invention.

DESCRIPTION OF EMBODIMENTS

Various exemplary embodiments, features, and aspects of the invention will be described in detail below with reference to the drawings.

Example 1

According to a first exemplary embodiment, one frame is divided into tiles, i.e., a plurality of rectangular regions as described in JCTVC-F335.doc Internet<http://phenix.int-evry.fr/jct/doc_end_user/documents/6_Torino/wg11/>).

Figure 2:
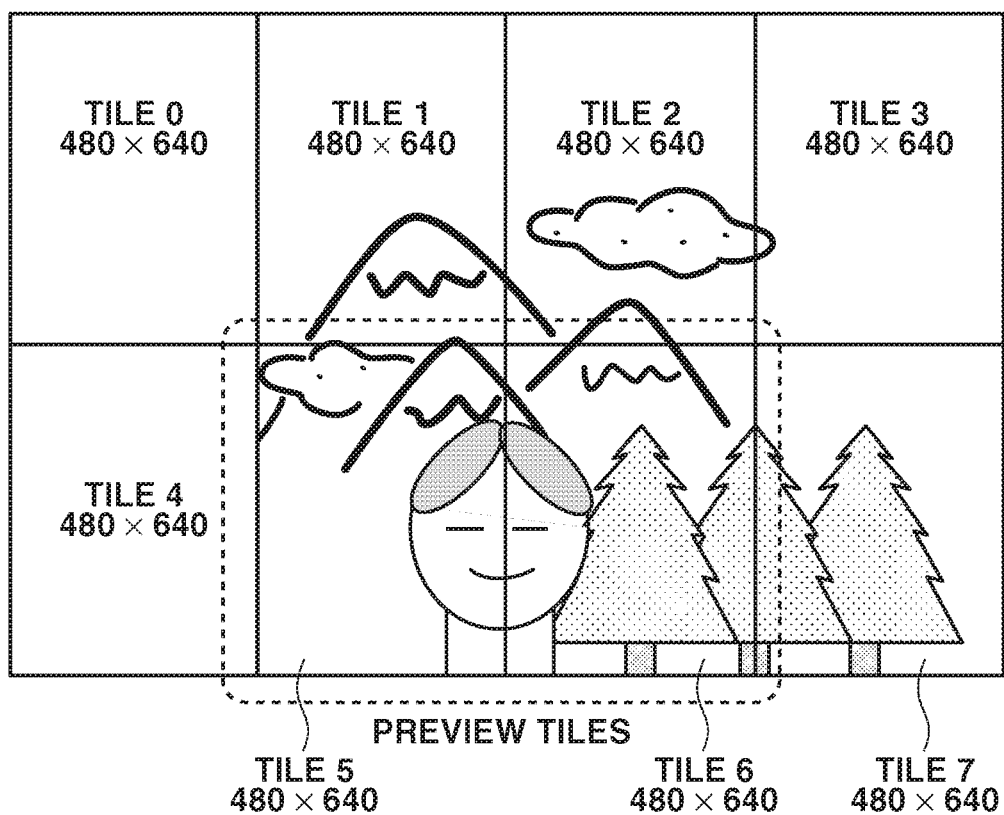
FIG. 2 illustrates tile numbers and the preview tile according to the first exemplary embodiment.

FIG. 2 illustrates a tile structure according to the first exemplary embodiment. Referring to FIG. 2, a frame of 1920 pixels in a horizontal direction and 1280 pixels in a vertical direction is divided into eight tiles. According to the coding format of the present exemplary embodiment, the block is configured by 32 pixels in the horizontal direction and 32 pixels in the vertical direction, and coding and decoding are performed for each block. Each tile size is a multiple of the block size, so that each tile illustrated in FIG. 2 is configured by 15 blocks in the horizontal direction by 20 blocks in the vertical direction.

Figure 1:
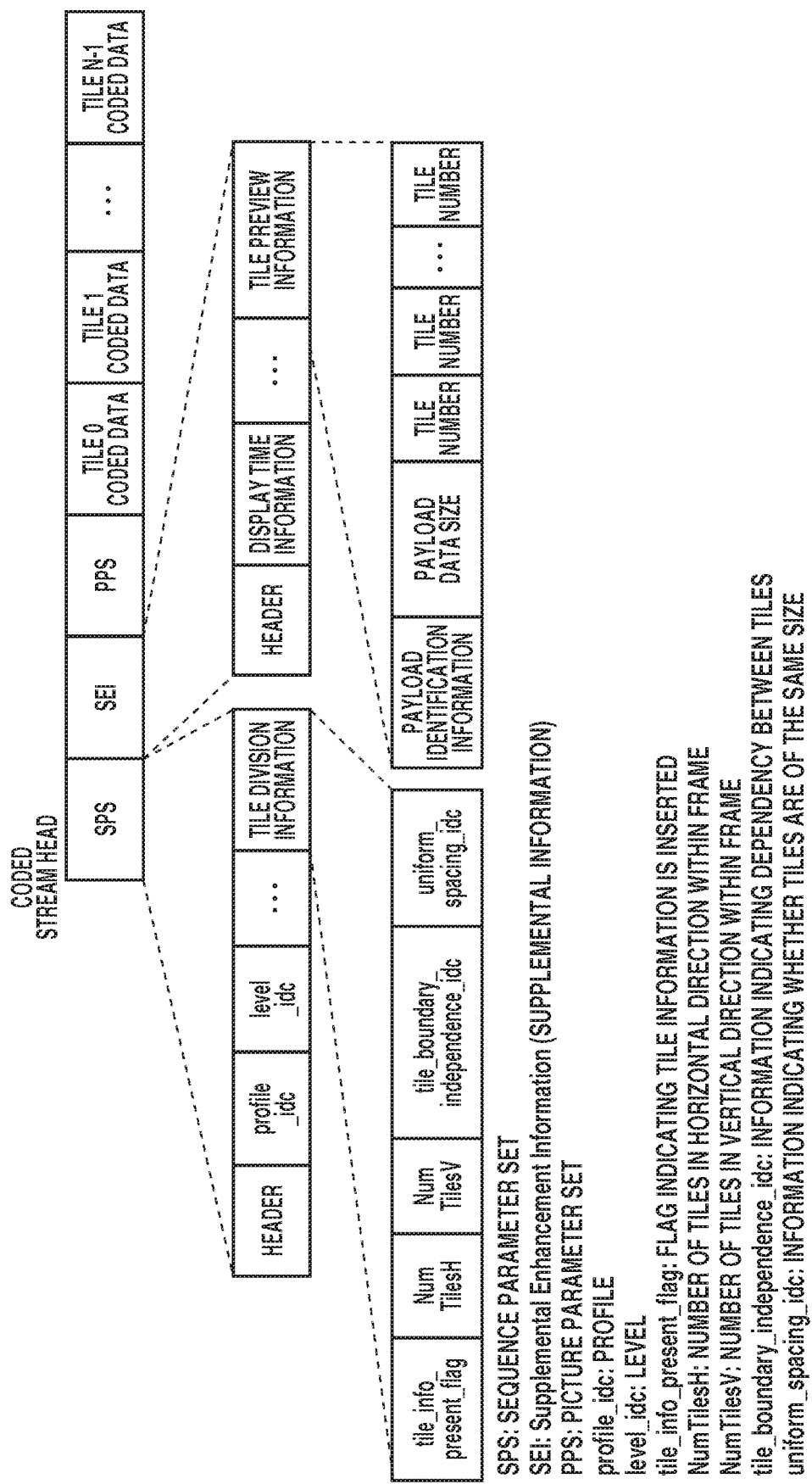
FIG. 1 illustrates a coding format according to a first exemplary embodiment of the present invention.

FIG. 1 illustrates an HEVC coded stream format according to the present exemplary embodiment. Referring to FIG. 1, a sequence parameter set (SPS), which includes the information on encoding an entire sequence, exists at the head of the coded stream. More specifically, a profile indicating a combination of decodable processes, a level indicating a range of parameter values that can be decoded, the number of pixels in the frame in the horizontal and vertical directions, and tile division information indicating the divided state of the tiles are inserted in the SPS.

The numbers of tiles in the horizontal direction and the vertical direction in the frame are inserted as the tile division information, indicated as NumTilesH and NumTilesV in FIG. 1. NumTilesH and NumTilesV respectively correspond to num_tile_columns_minus1 and num_tile_rows_minus1 described in JCTVC-F335.doc Internet<http://phenix.int-evry.fr/jct/doc_end_user/documents/6_Torino/wg11/>).

num_tile_columns_minus1 and num_tile_rows_minus1 respectively indicate numbers which are "1" less than the numbers of tiles in the horizontal direction and the vertical direction in the frame. The number of tiles in the frame is indicated as N in FIG. 1, which is uniquely determined by multiplying NumTilesH and NumTilesV.

If the number of tiles in the horizontal direction or the number of tiles in the vertical direction is greater than or equal to 2 (i.e., the tile division has been performed), uniform_spacing_idc, which is information indicating whether the sizes of the tiles are the same, is inserted. FIG. 2 illustrates an example where uniform_spacing_idc=1, i.e., the tiles of the same size are used.

Referring to FIG. 1, supplemental enhancement information (SEI), which is supplemental information that can be referred to as necessary when decoding the coded data, is inserted subsequent to the SPS. According to the present exemplary embodiment, the SEI defined in H.264 is used for ease of description. In addition to a display time etc, tile preview information as a payload (i.e., main data) is inserted as a part of SEI. More specifically, payload identification information indicating that the content of the payload is the tile preview information is inserted.

A payload size and tile numbers which are the main data of the tile preview information are inserted subsequent to the payload identification information. According to the present exemplary embodiment, the tile number is a number assigned to each tile in the frame in a raster-scanning order (i.e., from upper left, upper right, lower left, to lower right), from 0, 1, 2, . . . , to N−1.

Since the number of tiles in the tile division is 8 in the example illustrated in FIG. 2, the tile numbers from 0 to 7 are assigned in order from the upper left tile.

According to the present exemplary embodiment, each tile number is expressed using a number of bytes which can express the number of tiles in the frame. If the number of tiles in the frame is 255 or less as illustrated in FIG. 2, the tile number becomes 1 byte data, and if the number of tiles in the frame is 65535 or less, the tile number becomes 2 bytes data. However, the data size of each tile number is not limited thereto, and the data size of each tile number may be defined in bits, or a fixed data size that is predetermined according to the profile or the level may be used.

Further, the number of tiles to be used in the preview may be an arbitrary number which is greater than or equal to 1 and less than or equal to the number of tiles in the frame. Furthermore, when a plurality of tiles is to be used in the preview, a plurality of tiles adjacent to each other may be used, or a plurality of tiles apart from each other may be used.

The payload size of the tile preview information as the payload data is determined by (a data size of the tile number)×(the number of tiles to be used in the preview), according to the number of tiles to be used in the preview. For example, the payload size illustrated in FIG. 2 becomes 1 byte×2 tiles=2 bytes.

A picture parameter set (PPS) which is the header information including the information on picture coding, and the coded data of each file, are multiplexed subsequent to SEI.

Furthermore, SEI can include data indicating the number of tiles included in preview tile.

Figure 3:
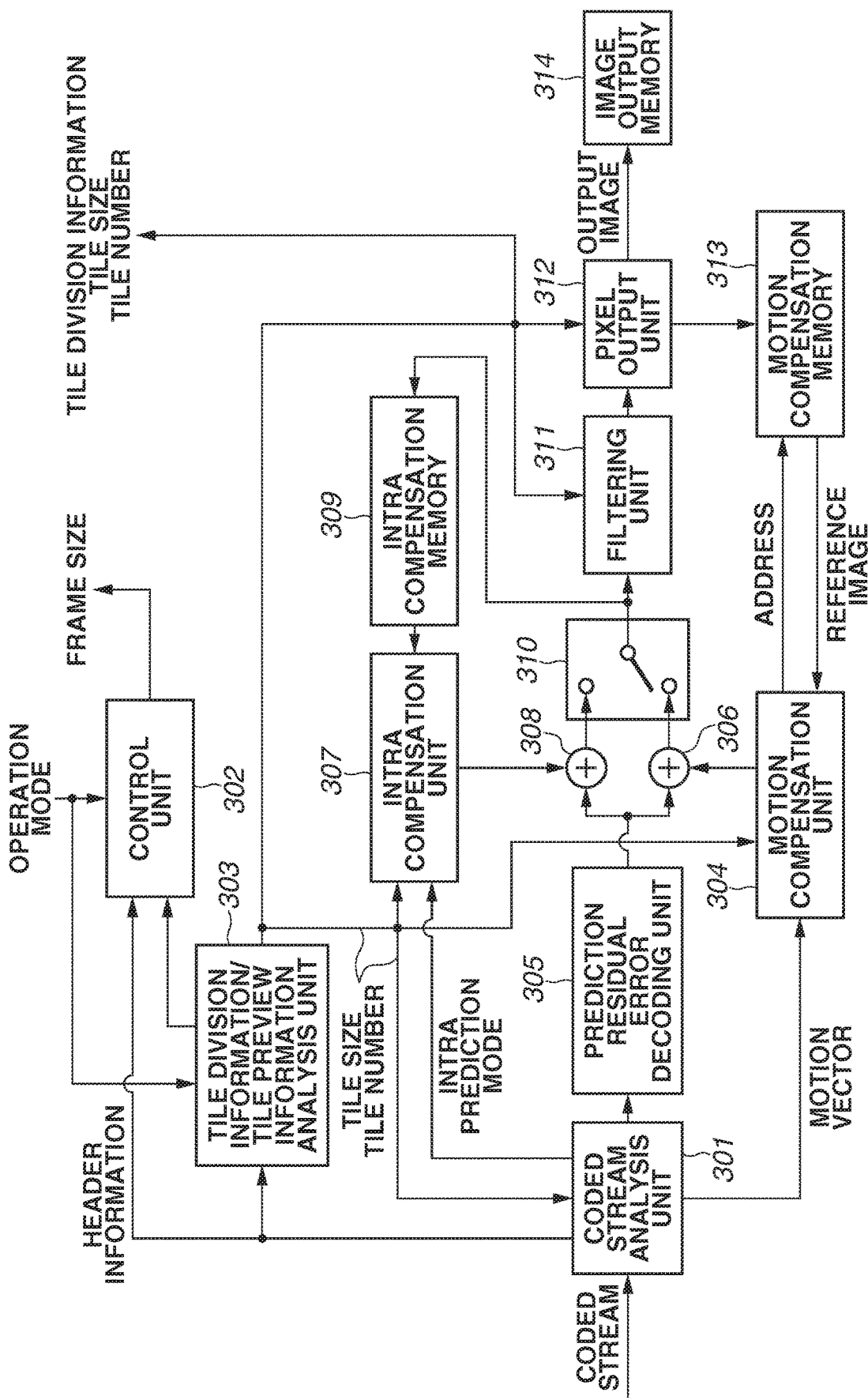
FIG. 3 is a block diagram illustrating an image decoding apparatus according to the first exemplary embodiment.

FIG. 3 is a block diagram illustrating the image decoding apparatus which decodes the coded stream according to the above-described image coding format. Referring to FIG. 3, the image decoding apparatus includes a coded stream analysis unit 301, a control unit 302, a tile division information/preview information analysis unit 303, a motion compensation unit 304, a prediction residual error decoding unit 305, an addition unit 306, an intra compensation unit 307, an addition unit 308, an intra compensation memory 309, a selection unit 330, a filtering unit 311, a pixel output unit 312, a motion compensation memory 313, and an image output memory 314.

The coded stream is input to the coded stream analysis unit 301. The coded stream analysis unit 301 then performs entropy decoding and separation processing on the header information including the SPS and the SEI that further includes the tile preview information, motion vectors, and quantized orthogonal transform coefficients of the coded prediction residual error. Entropy decoding performed in the coded stream analysis unit 301 may be either variable-length decoding or arithmetic decoding.

The control unit 302 receives from the coded stream analysis unit 301, the level, the profile, and various coding modes and parameters (i.e., motion prediction or intra prediction, and intra prediction mode). The control unit 302 then controls each process according to the received information.

The tile division information/preview information analysis unit 303 receives from the coded stream analysis unit 301, the tile division information such as the number of tiles in the horizontal and vertical directions. The tile division information/preview information analysis unit 303 then calculates the tile size (i.e., the number of pixels in the tile in the horizontal and vertical directions).

Further, the tile division information/preview information analysis unit 303 receives from the coded stream analysis unit 301, the tile preview information, and calculates a tile number list of the tiles to be used in the preview.

The tile division information/preview information analysis unit 303 then transmits to each of the processing units, the tile size, the tile number list of the tiles to be decoded, and tile_boundary_independencde_idc, i.e., information on whether there is dependency between the tiles.

If the coding mode of the block to be decoded is inter prediction, the motion compensation unit 304 generates an address with respect to the motion compensation memory 313 in which the image to be decoded for performing motion compensation is recorded. The motion compensation unit 304 generates the address according to the motion vector and the tile division information.

The motion compensation unit 304 then generates a reference block for performing motion compensation, using a reference image read from the motion compensation memory 313 (if the motion vector indicates a non-integer value, the motion compensation unit 304 performs filtering).

According to the present exemplary embodiment, it is assumed that the tiles are encoded without referring to the other tiles (i.e., tile_boundary_independencde_idc=1).

The prediction residual error decoding unit 305 performs inverse-quantization and inverse-orthogonal transform on the quantized orthogonal transform coefficients of the decoded prediction residual error, and generates the prediction residual error. The addition unit 306 adds the reference block output from the motion compensation unit 304 and the prediction residual error decoded by the prediction residual error decoding unit 305.

If the coding mode of the block to be decoded is intra prediction, the coded stream analysis unit 301 outputs the intra prediction mode to the intra compensation unit 307. The intra compensation unit 307 then reads from the intra compensation memory 309 the pixels corresponding to the intra prediction mode, and generates the reference block.

The addition unit 308 adds the reference block output from the intra compensation unit 307 and the prediction residual error.

A selection unit 310 selects the output from either the addition unit 306 or the addition unit 308 according to the coding mode. The image which has been added by the addition unit 306 or the addition unit 308 and decoded is recorded in the intra compensation memory 309 for performing intra compensation.

The filtering unit 311 receives the output from the selection unit 310, and performs filtering using a filter such as a de-blocking filter. The pixel output unit 312 refers to the tile information and calculates a memory address, and records in the motion compensation memory 313 and the image output memory 314.

Referring to FIG. 3, an operation mode is set from the outside to the control unit 302 and the tile division information/preview information analysis unit 303 previous to performing decoding. The operation mode indicates either a normal decoding mode which decodes the entire frame, or a partial decoding mode which decodes only the preview tile. The control unit 302 and the tile division information/preview information analysis unit 303 then control each process according to the set operation mode.

If the operation mode is the normal decoding mode, the coded stream analysis unit 301 performs subsequent to performing header information analysis, entropy decoding with respect to the coded data of all tiles. The coded stream analysis unit 301 also outputs the data to the motion compensation unit 304 or the intra compensation unit 307, and the prediction residual error decoding unit 305.

If the operation mode is the partial decoding mode, the coded stream analysis unit 301 only performs entropy decoding with respect to the coded data of all tiles. The coded stream analysis unit 301 then counts the decoded number of tiles, and calculates the tile numbers of the tiles being decoded.

However, the present invention is not limited thereto, and for example, if the header information contains the location information of each tile within the input coded stream, the coded stream analysis unit 301 only performs entropy decoding with respect to the coded data of the tiles in the tile number list of the preview tile alternatively.

If the tile numbers of the tiles that are being decoded are included in the tile number list of the preview tile transmitted from the tile division information/preview information analysis unit 303, the coded stream analysis unit 301 performs as follows. The coded stream analysis unit 301 outputs the coded data of the decoded tiles to the motion compensation unit 304 or the intra compensation unit 307, and the prediction residual error decoding unit 305.

If the tile numbers of the tiles that are being decoded are not included in the tile number list of the preview tile, the coded stream analysis unit 301 discards and does not output the coded data of the decoded tiles to the motion compensation unit 304 or the intra compensation unit 307, and the prediction residual error decoding unit 305.

It is necessary for the coded stream analysis unit 301 to decode and discard the coded data of the tiles not to be used in the preview to detect a starting position of the coded data of a subsequent tile according to the present exemplary embodiment, but is not limited thereto.

There is a case where the coded stream is multiplexed by a file format using a combination of the coded data and the data size of the coded data. An AVC file format which multiplexes H.264 coded data is such an example. More specifically, the data size indicating the number of bytes of the coded data is added and multiplexed for the coded data of each H.264 slice in the AVC file format.

If such a file format which multiplexes the data size along with the coded data is being used, the starting position of the coded data of the subsequent tile can be detected at high speed employing the data size.

Further, according to the present exemplary embodiments of the present invention, the unit for defining the data size is 1 tile. Furthermore, it is desirable that the data size is added to the coded data of each tile and multiplexed.

Referring to FIG. 3, a frame size, the tile division information, the tile size, and the tile numbers of the tiles to be decoded are transmitted to outside the image decoding apparatus. As a result, the size of the preview image can be calculated by an external device.

When a tile which has been decoded using the partial decoding mode is displayed, a display size is compared with the decoded tile size and the tile number, as will be described below in a sixth exemplary embodiment. An enlargement or reduction rate and a trimming size of the decoded tile are then determined according to the comparison result.

Figure 4:
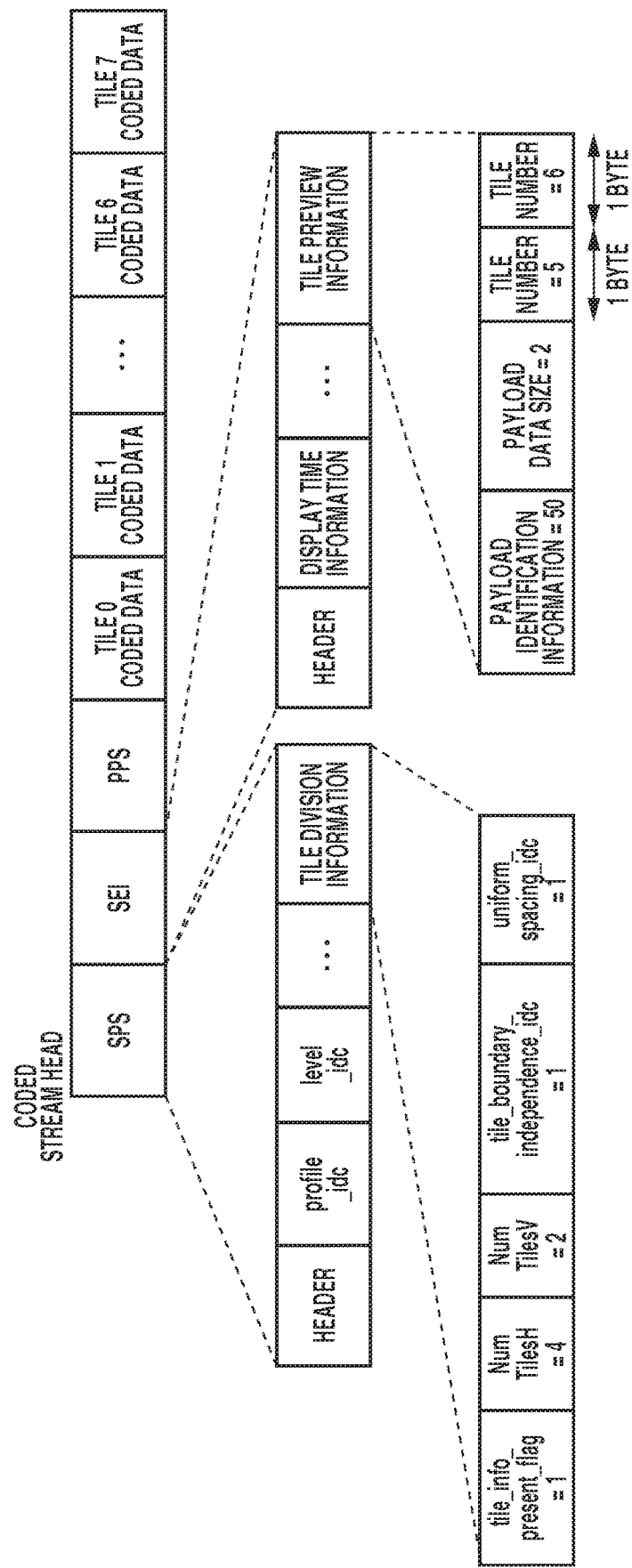
FIG. 4 illustrates a coded stream according to the first exemplary embodiment.

In the tile division example illustrated in FIG. 2, the preview tile is composed of tile 5 (tile number=5) and tile 6 (tile number=6). FIG. 4 illustrates a coded stream corresponding to FIG. 2. Referring to FIG. 4, the number of tiles in the tile preview information is 2, and the payload size of the tile preview information is 2 bytes.

According to the present exemplary embodiment, if the coded stream illustrated in FIG. 4 is to be decoded using the partial decoding mode (as an operation mode which decodes only the preview tile), the image decoding apparatus only decodes the header information, tile 5, and tile 6, and reproduces the image.

As described above, when the tile preview information is inserted as a portion of the SEI in the coded stream, the image decoding apparatus can uniquely determine the tiles to be used in the preview. The image decoding apparatus can thus provide the preview of the same content without depending on the image decoding/reproducing application.

Further, when performing previewing, the decoding processes following entropy coding may be omitted for the tiles that are not used in the preview, so that the preview can be displayed in a shorter time as compared to when decoding the entire frame. As a result, user-friendliness can be improved. Furthermore, the present exemplary embodiment may be applied to both the still image and the moving image.

The tile division number and the tile size are not limited to the above. As described above, the examples illustrated in FIG. 1 and FIG. 2 are the cases where the tile size is the same within the frame, i.e., when uniform_spacing_idc=1.

However, according to the present exemplary embodiment, an arbitrary tile size may be used by setting uniform_spacing_idc=0 and subsequently inserting the horizontal pixel number and the vertical pixel number of each tile as part of the tile information.

Further, the size of each block by which coding is to be performed is not limited to 32 pixels by 32 pixels, and sizes such as 16 pixels by 16 pixels or 64 pixels by 64 pixels may also be used.

Furthermore, the SEI may be inserted in the middle of the sequence, so that the position of the preview tile, the number of tiles included in preview tile and the size of the preview are changed.

Moreover, according to the present exemplary embodiment, an insertion position of the tile preview image is not limited to the SEI. For example, the tile preview information may be inserted as a portion of a video usability information (VUI) parameter which is a parameter of video display information in the SPS. Further, the tile preview information may be inserted as a portion of the PPS.

According to the present exemplary embodiment, it is desirable in terms of displaying the preview at highspeed that there is no dependency between the tiles (i.e., tile_boundary_independence_idc=1) as described above. However, the present invention is not limited thereto, and may be applied to the case where there is dependency between the tiles (i.e., tile_boundary_independence_idc=0). In such a case, it becomes necessary to decode at the same time the tiles surrounding the tiles to be used in the preview. The processing time required for displaying the preview image thus becomes longer as compared to when there is no dependency between the tiles.

According to the present exemplary embodiment, partial decoding mode is used for preview of image, but the present invention is not limited to the above. ROI (Region-of-Interest) tile where specified tiles included in ROI tile is decoded in priority to other tiles can be easily realized as the same manner as preview tile in the present exemplary embodiment. In that case, ROI information is inserted as apart of SEI or VUI instead of tile preview information. Similarly as preview tile, ROI tile can be comprised of a plurality of tiles.

According to the present exemplary embodiment, decoding apparatus detects the number of tiles included in preview tile or ROI tile based on a data size of the tile number and payload size of the tile preview information in SEI or VUI, but the present invention is not limited to the above. As mentioned above, SEI or VUI can include a code indicating the number of tiles included in preview tile or ROI tile.

Furthermore, having a plurality of preview tiles or ROI tiles can be easily realized according to the present exemplary embodiment. SEI or VUI can include a code indicating the number of preview tiles or ROI tiles. Decoder can detect the number of preview tiles or ROI tiles with the specific code, or decoder may detect according to the length of payload.

Example 2

Figure 5:
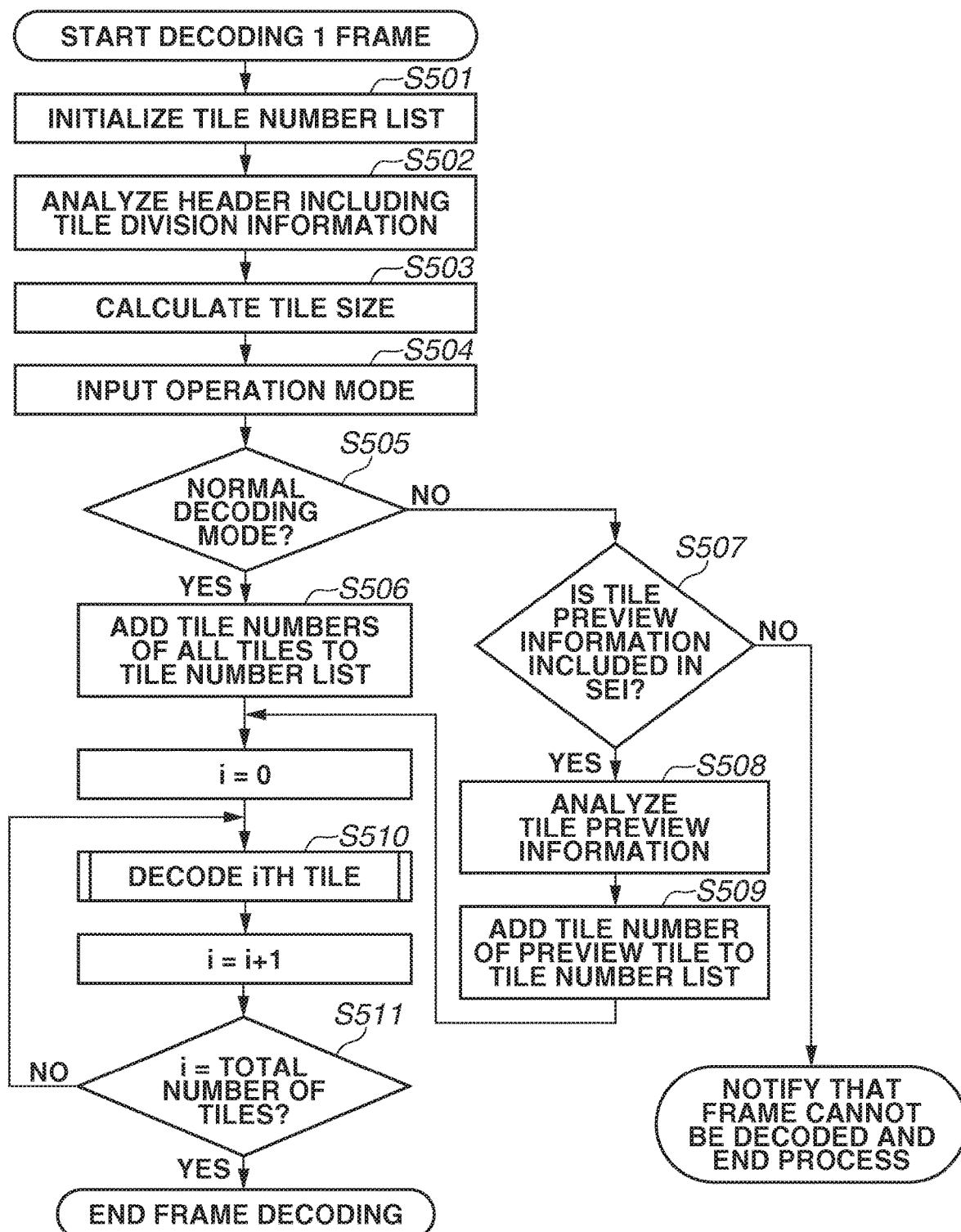
FIG. 5 is a flowchart illustrating a process for decoding each frame according to a second exemplary embodiment of the present invention.
Figure 6:
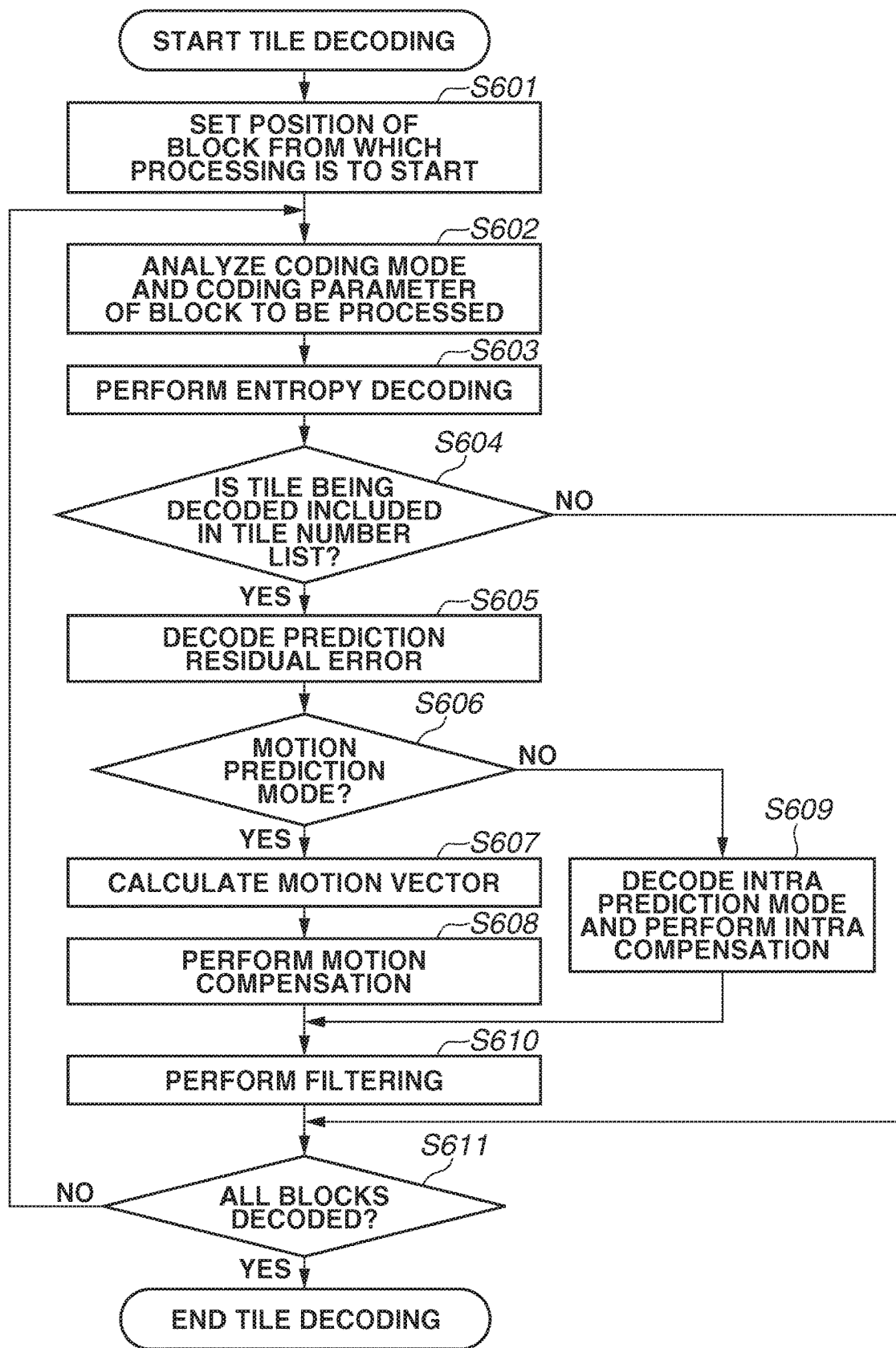
FIG. 6 is a flowchart for decoding each tile according to the second exemplary embodiment.

According to the present invention, decoding of the coded stream can be realized as a software program running on a central processing unit (CPU). FIG. 5 and FIG. 6 are flowcharts illustrating programs for decoding 1 frame according to a second exemplary embodiment. The format of the coded stream and the division of the tiles are the same as the first exemplary embodiment.

In step S501, the CPU initializes (empties) the tile number list which is internal information of the program. In step S502, the CPU analyzes the header information in the coded stream, such as the SPS including the tile division information and the SEI.

In step S503, the CPU calculates the tile size of each tile from the tile division information analyzed in step S502. In step S504, the CPU externally sets the operation mode (i.e., the normal decoding mode or the partial decoding mode) of the decoding program.

In step S505, the CPU determines whether the operation mode is the normal decoding mode. If the operation mode is the normal decoding mode (YES in step S505), the process proceeds to step S506. If the operation mode is the partial decoding mode (NO in step S505), the process proceeds to step S507.

In step S506, since the operation mode is the normal decoding mode, the CPU adds to the tile number information which is the internal information of the decoding program, all of the tile numbers in the frame, i.e., 0, 1, . . . to [tile number−1].

In step S507, the CPU confirms whether the SEI analyzed in step S502 includes the tile preview information. If the tile preview information is not included (NO in step S507), the CPU notifies that decoding cannot be performed in the partial decoding mode. The process then ends.

In step S508, the CPU analyzes the preview tile number list included in the tile preview information in the SEI. In step S509, the CPU adds to the tile number list which is the internal information of the decoding program, all of the tile numbers of the preview tile analyzed in step S508.

In step S510 and step S511, the CPU decodes the coded data of the tiles and calculates the tile number of the tile that is being decoded (i.e., "i" in the flowchart illustrated in FIG. 5). In step S510, the CPU decodes and reproduces the image for the tiles included in the tile number list, and only performs entropy decoding on the tiles not included in the tile number list.

If the coded stream includes a plurality of image frames, the CPU repeats the processes from step S501 to step S511 to the last frame.

FIG. 6 is a flowchart illustrating the decoding process of each file performed in step S510 illustrated in FIG. 5. The process to be described below is performed for each block.

In step S601, the CPU calculates from the tile division information analyzed in step S502 and the tile number of the block to be processed acquired in step S510 illustrated in FIG. 5, the position of the block from which processing is to be started. In step S602, the CPU extracts from the header information of each block, the coding mode and the coding parameter of the block to be decoded.

In step S603, the CPU performs entropy decoding (variable-length decoding or arithmetic decoding) on the coded quantized orthogonal transform coefficients of the prediction residual error, the intra prediction mode or the motion vector (if included).

In step S604, the CPU determines whether the tile number of the tile that is being decoded (i.e., "i" illustrated in FIG. 5) is included in the tile number list generated in step S506 or step S509 illustrated in FIG. 5. If the tile number that is being decoded is included in the tile number list (YES in step S604), the process proceeds to step S605. If the tile number being decoded is not included in the tile number list (NO in step S604), the process proceeds to step S611. Further, the CPU discards the entropy-decoded data.

In step S605, the CPU performs inverse-quantization and inverse-transform on the entropy-decoded quantized orthogonal transform coefficients of the prediction error, and decodes the prediction error.

In step S606, the CPU determines whether the coding mode of the block to be decoded analyzed in step S602 is the inter prediction mode or the intra prediction mode. If the coding mode is the inter prediction mode (YES in step S606), the process proceeds to step S607. If the coding mode is the intra prediction mode (NO in step S606), the process proceeds to step S609.

In step S607, the CPU performs compensation with respect to the motion vector decoded in step S603 and the surrounding motion vectors, and calculates the motion vector for performing motion compensation.

In step S608, the CPU performs motion compensation. More specifically, the CPU uses the motion vector generated in step S607 and generates the reference block for performing motion compensation, and adds the reference block to the prediction error.

As a result, the image data of the block is generated.

In step S609, the CPU performs intra compensation according to the intra prediction mode extracted in step S602. The CPU then replaces the pixels located outside the tile similarly as in the first exemplary embodiment.

In step S610, the CPU performs filtering using the de-blocking filter with respect to the block which has been decoded and generated by performing motion compensation or intra compensation.

In step S611, the CPU determines whether all blocks in the tile have been decoded. If decoding has not been completed (NO in step S611), the process returns to step S602. If decoding has been completed (YES in step S611), the tile decoding process ends.

As described above, in the case where the image decoding process is realized using the program, the same result as the first exemplary embodiment can be acquired by employing software. The present exemplary embodiment may also be applied to the case where the file format into which the coding data and the data size are multiplexed is used in multiplexing the coded stream, similarly as in the first exemplary embodiment.

If the operation mode is the partial decoding mode and the file format into which the data size is multiplexed is being used, a portion of the tile decoding process in step S510 illustrated in FIG. 5 can be omitted.

In such a case, the coded data of the tiles not to be used in the preview can be discarded by referring to the data size, so that the subsequent coded data can be decoded and the image can be reproduced at high speed.

According to the present exemplary embodiment, the tile size and the tile division number are not limited to the above. Further, since the present exemplary embodiment may be applied to both the still image and the moving image, the operation mode is input in step S504. However, the present invention is not limited thereto, and the operation mode may be input any time before step S505.

Furthermore, according to the present exemplary embodiment, whether decoding can be performed is determined based on the tile preview information in the SEI. However, the present invention is not limited thereto. A profile including the tile preview information may be set, and the CPU may determine whether decoding can be performed based on the profile.

Similarly as in the first exemplary embodiment, ROI tile can be easily realized as the same manner as decoding program of preview tile in the present exemplary embodiment. Similarly as in the first exemplary embodiment, both preview tile and ROI tile can be comprised of a plurality of tiles.

Furthermore, having a plurality of preview tiles or ROI tiles can be easily realized according to the present exemplary embodiment similarly as in the first exemplary embodiment. If two ROI tiles are used in coded stream for example, steps S508 and S509 may be performed twice.

Example 3

Figure 7:
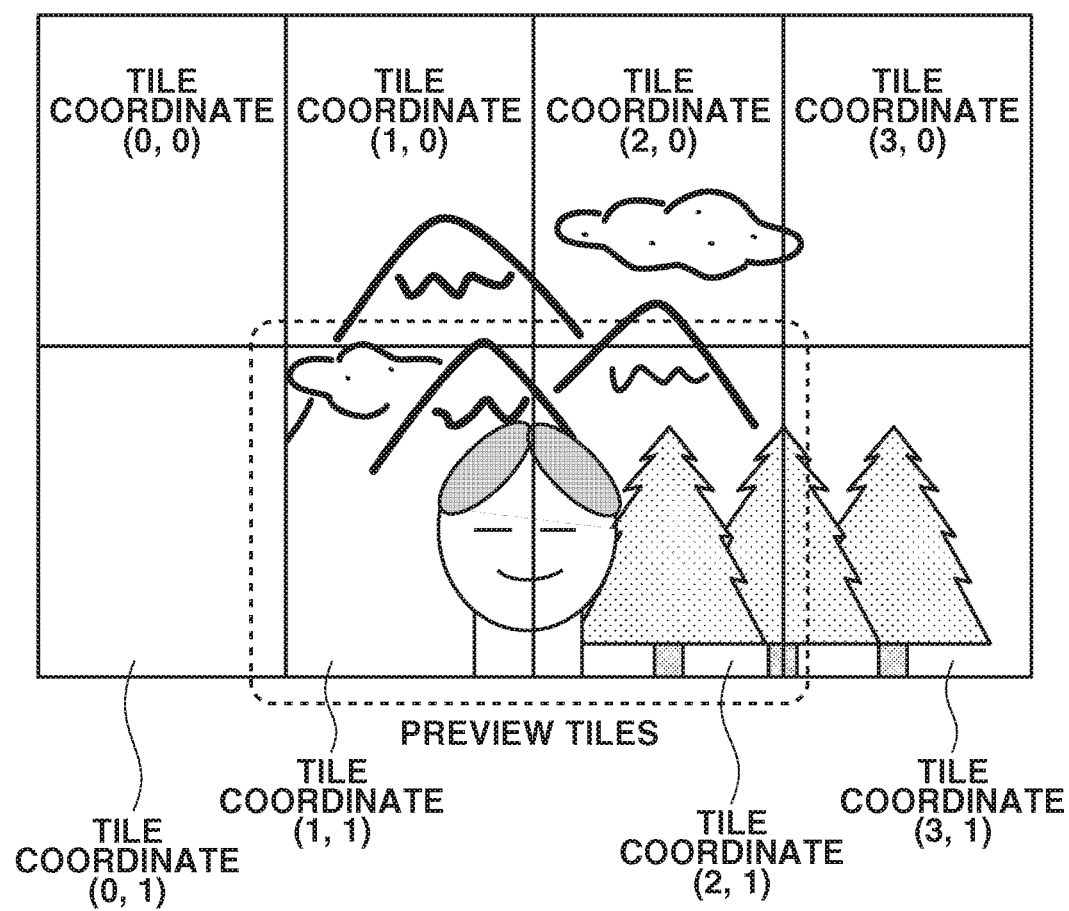
FIG. 7 illustrates tile coordinates and the preview tile according to a third exemplary embodiment of the present invention.

The coding format according to a third exemplary embodiment of the present invention is different from the first exemplary embodiment in that the coordinates (i.e., a horizontal position and a vertical position) of each tile in the frame is inserted as the tile preview information, instead of the tile number. FIG. 7 illustrates the coordinates of each of the tiles when tile division is performed similarly as illustrated in FIG. 2.

FIG. 8A illustrates a coding format according to the present exemplary embodiment. FIG. 8B illustrates an example of a coded stream corresponding to the tile division and the preview tile (tile coordinate (1, 1) and tile coordinate (2, 1)) illustrated in FIG. 7. As illustrated in FIGS. 8A and 8B, the horizontal position and the vertical position, i.e., the coordinates of each tile, are inserted as the tile preview information. The payload identification information of the same value as according to the first exemplary embodiment can be used.

According to the present exemplary embodiment, each horizontal position and vertical position are expressed as the number of bytes that can indicate the number of tiles in the horizontal direction and the vertical direction in the frame. In the example illustrated in FIG. 7, the tile horizontal position and the tile vertical position are payloads of 1 byte, and the number of tiles in preview tile×2 bytes is inserted as the payload size of the tile preview information.

The data sizes in the horizontal position and the vertical position are not limited thereto, similarly as in the first exemplary embodiment. The data size of each tile number may be defined by bits, or may be set as a fixed data size predetermined according to the profile and the level.

The tile division information illustrated in FIGS. 8A and 8B are of the same values as the tile division information illustrated in FIGS. 1 and 4. Further, NumTilesH and NumTilesV illustrated in FIG. 8A indicate the horizontal tile number and the vertical tile number in the frame, similarly as in the first exemplary embodiment.

The image decoding apparatus is configured as illustrated in FIG. 3, similarly as in the first exemplary embodiment. In such a case, the tile division information/tile preview information analysis unit 303 analyzes as the tile identification information, spatial coordinates of the tiles to be used in the preview.

The tile division information/tile preview information analysis unit 303 then transmits the tile division information, the tiles to be decoded, and a tile spatial coordinate list of the tiles to be decoded to each processing unit based on the result of analyzing the spatial coordinates of the preview tile.

The coded stream analysis unit 301 counts the number of decoded tiles and calculates the tile numbers. Further, the coded stream analysis unit 301 calculates the spatial coordinates of the tiles being decoded from the tile number and the tile division information.

The vertical coordinate of the normal tile can be calculated by dividing the tile number by the number of tiles in the horizontal direction. Further, the horizontal coordinate of the tile can be calculated by tile number % number of tiles in the horizontal direction. "%" indicates residue calculation.

The coded stream analysis unit 301 outputs to the motion compensation unit 304 or the intra compensation unit 307, and the prediction residual error decoding unit 305, the coded data of the decoded tile only in the following case. The coded stream analysis unit 301 outputs the coded data, only when the spatial coordinates of the tile being decoded are included in the spatial coordinate list of the tiles to be used in the preview, which is transmitted from the tile division information/tile preview information analysis unit 303.

As described above, the similar result as acquired in the first exemplary embodiment can be realized using the spatial coordinates of the tiles as the tile preview information.

Further, the present exemplary embodiment may be realized by a software program similarly as according to the second exemplary embodiment. According to the present exemplary embodiment, the tile spatial coordinate list configured of the spatial coordinates of each tile is used instead of the tile number list according to the second exemplary embodiment.

More specifically, in step S501 illustrated in FIG. 5, the CPU initializes the tile spatial coordinate list. In step S506, the CPU adds to the tile spatial coordinate list, the spatial coordinate list of all tiles in the frame. In step S509, the CPU adds the spatial coordinates of the tiles to be used in the preview to the tile spatial coordinate list.

Further, in step S604 illustrated in FIG. 6, the CPU calculates from the tile number of the tile that is being decoded (i.e., "i" illustrated in FIG. 5) and the tile division information, the spatial coordinates of the tile that is being decoded, similarly as in the second exemplary embodiment. The CPU then compares the calculated spatial coordinates and the spatial coordinates in the tile spatial coordinate list. If the spatial coordinates of the tile that is being decoded is included in the tile spatial coordinate list, the process proceeds to step S605, and the CPU generates the image data.

According to the present exemplary embodiment, the tile size and the tile division number are not limited thereto.

Similarly as in the exemplary embodiments above, ROI tile can be easily realized as the same manner as the present exemplary embodiment and both preview tile and ROI tile can be comprised of a plurality of tiles.

Furthermore, similarly as in the exemplary embodiments above, SEI or VUI can include specific code indicating the number of tiles included in preview tile or ROI tile as well as coordinates of tiles.

Furthermore, having a plurality of preview tiles or ROI tiles can be easily realized according to the present exemplary embodiment similarly as in the exemplary embodiments above.

Example 4

A fourth exemplary embodiment according to the present invention will be described below. According to the present exemplary embodiment, the coding format uses the tile preview information employing the tile number, similarly as in the first exemplary embodiment. However, the order of multiplexing the coded data of each tile into the coded stream is different from the first exemplary embodiment.

Figure 9:
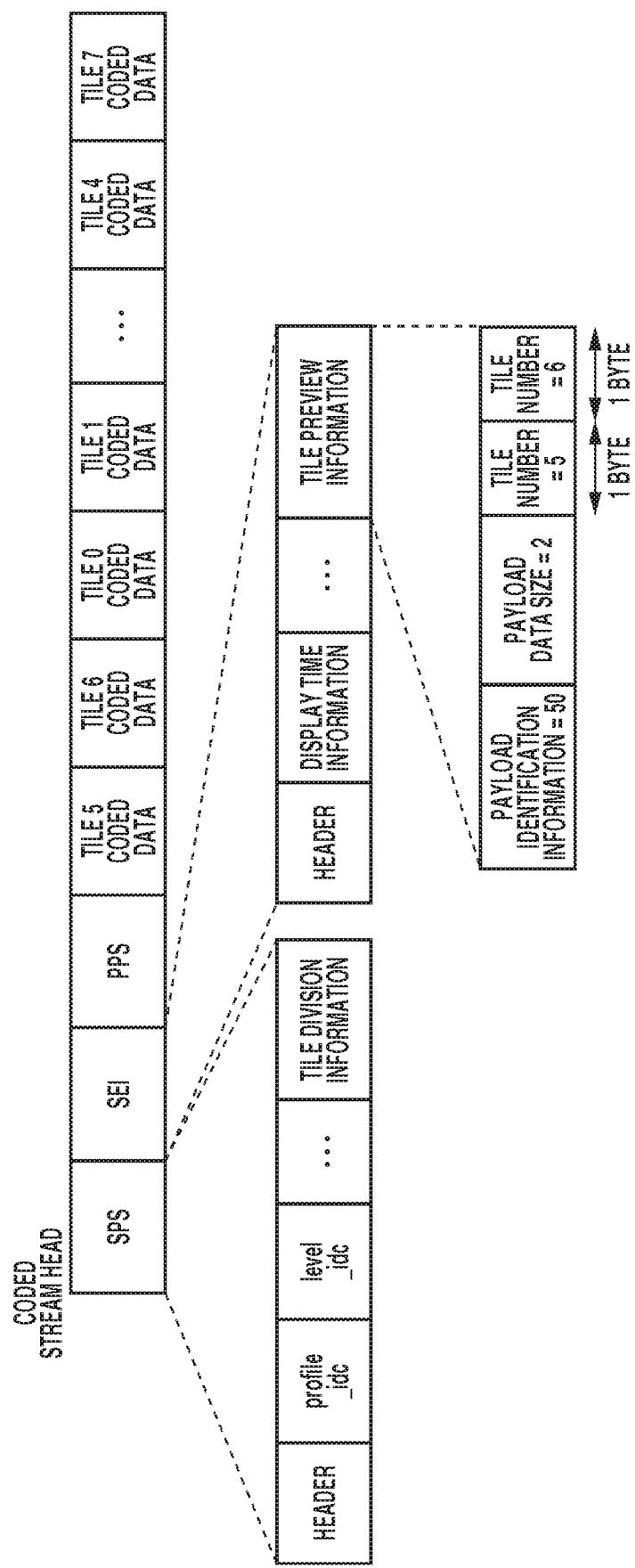
FIG. 9 illustrates a coded stream according to a fourth exemplary embodiment of the present invention.

FIG. 9 illustrates an example of a coded stream corresponding to the tile division and the preview tile (i.e., tile 5 and tile 6) illustrated in FIG. 2. Referring to FIG. 9, according to the present exemplary embodiment, the tiles to be used in the preview are multiplexed into the coded stream before the other files in the coded stream.

The image coding apparatus is configured as illustrated in FIG. 3, similarly as in the first exemplary embodiment. According to the present exemplary embodiment, the coded stream analysis unit 301 can acquire the preview tile to be decoded directly after performing header analysis.

As a result, it is not necessary to perform entropy decoding of the coded data of the tiles that are not to be decoded and discard the result as in the first exemplary embodiment.

A similar result as acquired according the first exemplary embodiment can thus be acquired, and the process can be performed at higher speed.

Further, the present exemplary embodiment can also be realized by a software program as in the second exemplary embodiment. Furthermore, according to the present exemplary embodiment, the tile size and the tile division number are not limited thereto.

Similarly as in the exemplary embodiments above, different order of coded stream for ROI tiles can be easily realized as the same manner as the present exemplary embodiment. Both preview tile and ROI tile can be comprised of a plurality of tiles.

Furthermore, having a plurality of preview tiles or ROI tile can be easily realized according to the present exemplary embodiment.

Example 5

Figure 10:
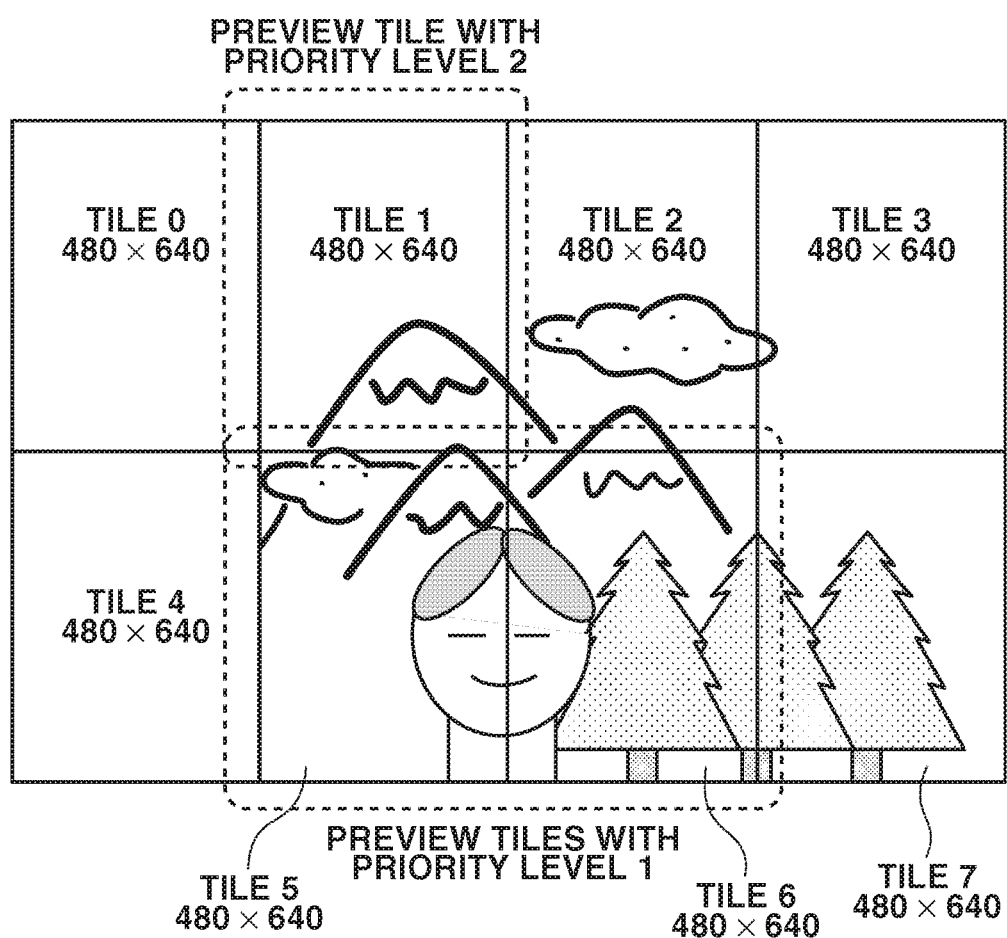
FIG. 10 illustrates tile numbers and preview tiles according to a fifth exemplary embodiment of the present invention.

A fifth exemplary embodiment of the present invention will be described below. According to the present exemplary embodiment, the coding format uses a plurality of payload identification information corresponding to a plurality of priority levels, and a plurality of tile preview information including the priority level is inserted thereto. The tile number is used as the payload of the tile preview information similarly as in the first exemplary embodiment. FIG. 10 illustrates the preview tiles including the tile division and the priority levels according to the present exemplary embodiment.

FIG. 11A illustrates a coding format according to the present exemplary embodiment. Referring to FIG. 11A, "N" indicates the number of tiles in the frame, similarly as illustrated in FIG. 1. Further, FIG. 11B illustrates a coded stream in the case where, in the tile division illustrated in FIG. 10, tile 5 and tile 6 are used as priority level 1 (of higher priority levels) and tile 1 is used as priority level 2 (of a lower priority level).

Referring to FIG. 11B, according to the present exemplary embodiment, in the coded stream, different payload identification information corresponding to the priority level is used. In FIG. 11B, when the priority level is 1, the payload identification information is 50, and when the priority level is 2, the payload identification information is 51. A plurality of tile preview information corresponding to the plurality of priority levels is thus inserted in the SEI. According to the present exemplary embodiment, the data size of the tile number is fixed as 2 bytes. Further, the values of the identification information are not limited thereto.

The image decoding apparatus has the configuration illustrated in FIG. 3 similarly as in the first exemplary embodiment. In such a case, the operation mode and the priority level information are externally set to the control unit 302 and the tile division information/preview information analysis unit 303.

If the image decoding apparatus is to operate in the partial decoding mode, the tile division information/preview information analysis unit 303 selects the tile preview information including the payload identification information corresponding to the priority level set from the outside. The image decoding apparatus thus performs decoding similarly as in the first exemplary embodiment.

As described above, the payload identification information is used to insert in the SEI the plurality of tile preview information according to the priority levels, the user can switch between the plurality of previews and correctly acquire the contents. Further, the present exemplary embodiment realizes a similar result as according to the first exemplary embodiment. Furthermore, the content creator becomes capable of providing a more flexible preview.

Moreover, the present exemplary embodiment can also be realized by a software program as according to the second exemplary embodiment. In such a case, in step S508 illustrated in FIG. 5, the CPU extracts only the tile preview information including the payload identification information corresponding to the priority level which has been externally set. In step S509, the CPU generates the tile number list.

According to the present exemplary embodiment, the tile size, the tile division number, and a definable number of the priority levels are not limited thereto. Further, the values of the payload identification information to be used are not limited thereto, and any value may be used. Furthermore, if the file format into which the coded data and the data size are multiplexed is to be used, decoding can be performed at higher speed.

Furthermore, according to the present exemplary embodiment, processing can be performed at high speed according to the priority level by generating the coded stream starting from the tile of high priority level, similarly as in the fourth exemplary embodiment.

According to the present exemplary embodiment, two priority levels are assigned to the tiles and encoded. However, it is not limited thereto. For example, the number of the priority levels may be transmitted to the SEI as a code. As a result, if the number of priority levels is large, it becomes unnecessary to assign a unique priority level to the identification information of the payload. The present exemplary embodiment can thus be realized by assigning the priority level in the order of decoding to each payload.

Further, the tile number of the lowest priority level can be omitted by transmitting the number of priority levels as a code to the configuration illustrated in FIG. 11A.

Similarly as in the exemplary embodiments above, ROI tile can be easily realized as the same manner as preview tile in the present exemplary embodiment and both preview tile and ROI tile can be comprised of a plurality of tiles.

Furthermore, similarly as in the exemplary embodiments above, SEI or VUI can include specific code indicating the number of tiles included in each preview tile or ROI tile. Also, a plurality of preview tiles or ROI tiles can be used and SEI or VUI can include a code indicating the number of preview tiles or ROI tiles.

According to the present exemplary embodiment, each payload associated with priority level includes the plurality of the tile number, but the present invention is not limited to the above. SUI or VUI can include data set which is set of the tile number and priority level. Each preview tile or ROI tile can have the data set for each tile inside. If a plurality of preview tiles or ROI tiles are included in coded stream, length of tile preview information is determined by ((a data size of the tile number)+(a data size of the priority level))× (the number of tiles to be used in the preview)×(the number of preview tile or ROI tile).

Example 6

A sixth exemplary embodiment of the present invention will be described below. According to the present exemplary embodiment, the coding format inserts in the SEI as the tile preview information, offset information to the tile, in addition to the tile number. The sixth exemplary embodiment uses the tile division used in the first exemplary embodiment.

FIG. 12A illustrates a coding format according to the present exemplary embodiment. FIG. 12B illustrates an example of a coded stream corresponding to the tile division and the preview tile illustrated in FIG. 2.

Referring to FIG. 12A, according to the present exemplary embodiment, the offset information to the coded data of the tile corresponding to the tile number is inserted in the coded stream as the tile preview information along with the tile number to be used in the preview.

The offset information indicates the number of bytes from the head of the coded data of each picture to the coded data of the tile to be used in the preview. However, the offset information according to the present invention is not limited thereto.

Further, in the case of the moving image, the number of bytes from the head of the coded data of each picture to the coded data of the tile is different among the pictures. It is thus necessary to insert the tile preview information for each picture.

According to the present exemplary embodiment, the data size of the offset information is fixed as 4 bytes. However, it is not limited thereto, and the data size can be determined as appropriate according to a parameter such as a level. Further, the number of bytes of each of the offset information may be defined and transmitted directly after the payload data size.

Referring to FIG. 12B, 1 byte corresponding to the tile number and 4 bytes corresponding to the offset information are inserted for each preview tile in the tile preview information. According to the present exemplary embodiment, 2 tiles are used as the preview tile, so that the payload data size becomes 5 bytes×2 tiles=10 bytes.

L5 in the coded stream illustrated in FIG. 12B indicates the number of bytes from the head of the coded data of the picture to the coded data of tile 5, i.e., the preview tile. Further, L6 indicates the number of bytes to the coded data of tile 6.

The image decoding apparatus is configured as illustrated in FIG. 3, similarly as in the first exemplary embodiment. In such a case, the control unit 302 and the tile division information/preview information analysis unit 303 analyze the tile division information, the tile number, and the offset information to the coded data.

The analyzed offset information is input to the coded stream analysis unit 301. If the operation mode is the partial decoding mode, the coded stream analysis unit 301 refers to the received offset information. The coded stream analysis unit 301 then discards the coded data prior to the preview tile, or directly reads the location of the coded data using the address corresponding to the offset information.

The coded stream analysis unit 301 decodes the coded data of the tile after reaching the coded data of the preview tile. The coded stream analysis unit 301 outputs the decoded data to the motion compensation unit 304 or the intra compensation unit 307, and the prediction residual error decoding unit 305.

As described above, the offset information to the coded data of the tile to be used in the preview is inserted in the SEI as the tile preview information. As a result, a similar result as acquired according to the first exemplary embodiment can be acquired, and the operation using the partial decoding mode can be performed at higher speed.

Further, the present exemplary embodiment may be realized by a software program similarly as according to the second exemplary embodiment. In such a case, in step S508 illustrated in FIG. 5, the CPU analyzes the tile number and the offset information of the tile in the tile preview information. In step S509, the CPU generates the tile number list including the tile number and the offset information of the tile.

Furthermore, according to the present exemplary embodiment, the priority level can be added, and a plurality of tile preview information including the tile offset information can be inserted similarly as according to the fifth exemplary embodiment. The image decoding apparatus generates the coded stream from the tile of higher priority level, so that processing can be performed at high speed according to the priority level.

According to the present exemplary embodiment, the tile size, the tile division number, and the number of definable priority levels are not limited thereto. Further, according to the present exemplary embodiment, the offset is indicated by the number of bytes. However, it is not limited thereto, and, for example, a packet of a fixed length may be defined, and an offset value may be indicated by the number of packets.

Similarly as in the exemplary embodiments above, ROI tile can be easily realized as the same manner as preview tile in the present exemplary embodiment. Further having a plurality of preview tiles and ROI tiles can be easily realized by inserting tile offset information for each preview tile or ROI tile.

Example 7

A seventh exemplary embodiment of the present invention will be described below. An image display system according to the present exemplary embodiment includes the image decoding apparatus according to the first, second, third, fourth, fifth, and sixth exemplary embodiments.

Figure 13:
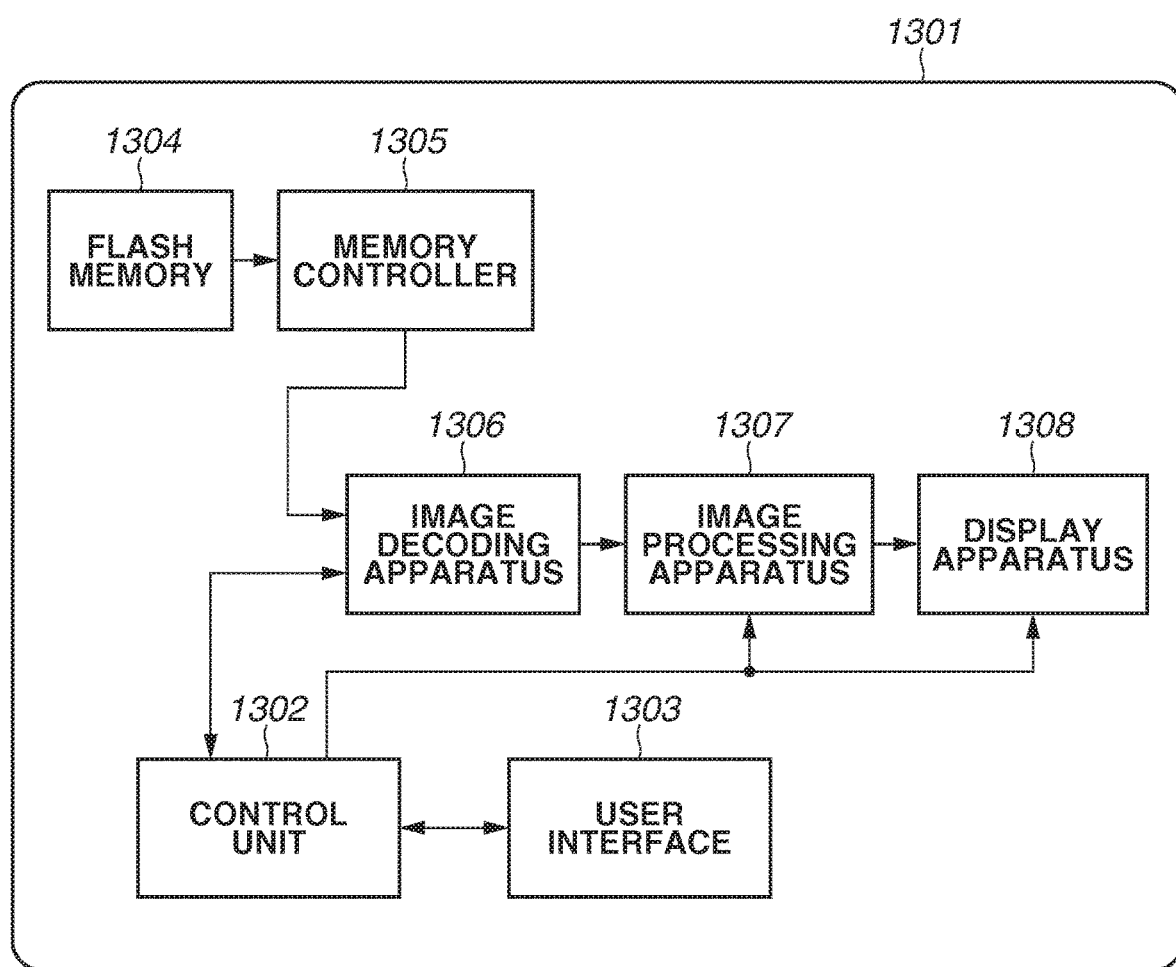
FIG. 13 is a block diagram illustrating an image display system according to a seventh exemplary embodiment of the present invention.

FIG. 13 illustrates an image display system according to the present exemplary embodiment. Referring to FIG. 13, an image display system 1301 includes a control unit 1302, a user interface 1303, a flash memory 1304, a memory controller 1305, an image decoding apparatus 1306, an image processing apparatus 1307, and a display apparatus 1308.

The user interface 1303 inputs and transmits to the control unit 1302 the operation mode according to a user operation. The control unit 1302 controls the memory controller 1305, the image decoding apparatus 1306, the image processing apparatus 1307, and the display apparatus 1308 according to the input operation mode.

The image display system 1301 decodes and displays the coded stream recorded in the flash memory 1304. More specifically, the memory controller 1305 reads and inputs to the image decoding apparatus 1306 the coded stream recorded in the flash memory 1304.

The image decoding apparatus 1306 then decodes the coded stream, and outputs the decoded image. According to the present exemplary embodiment, the image decoding apparatus 1306 may use any of the configurations according to the first, second, third, fourth, fifth, and sixth exemplary embodiments. Further, the image decoding apparatus 1306 outputs to the control unit 1302 the tile division information and the tile preview information extracted from the header information of the coded stream.

The image processing apparatus 1307 performs color conversion on the image decoded by the image decoding apparatus 1306 for displaying the image. Further, at the same time, the image processing apparatus 1307 reads from the control unit 1302 the operation mode and the tile information. The image processing apparatus 1307 then enlarges or reduces and trims the decoded image according to the frame size and the operation mode input from the image decoding apparatus 1306 and the display size of the display apparatus 1308. The display apparatus 1308 thus displays the output from the image processing apparatus 1307.

Figure 14A:
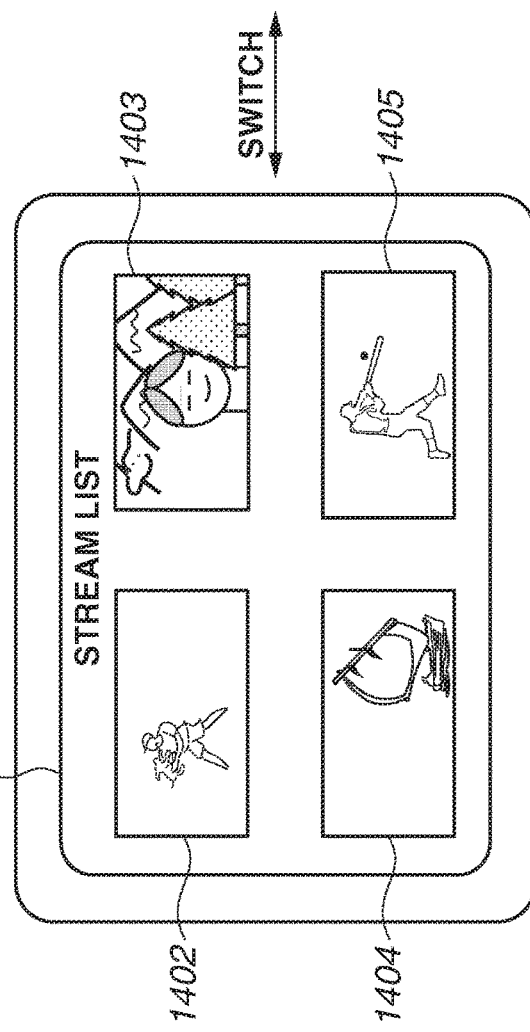
FIGS. 14A and 14B illustrate display examples of the image display system according to the seventh exemplary embodiment.
Figure 14B:
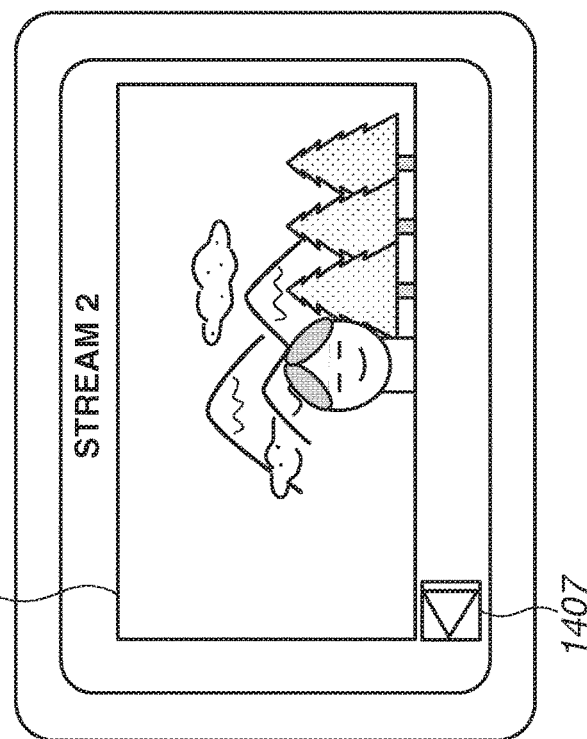

FIGS. 14A and 14B illustrate display examples of an image display system according to the present exemplary embodiment. More specifically, FIGS. 14A and 14B illustrate examples of the contents displayed on the display apparatus 1308. Referring to FIGS. 14A and 14B, the displayed contents include a display area 1401, preview displays 1402, 1403, 1404, and 1405, a normal display 1406, and a back instruction unit 1407. The display area 1401 corresponds to the display apparatus 1308.

The preview displays 1402, 1403, 1404, and 1405 which function as the display apparatus also functions as the user interface 1303 by employing a touch panel method.

FIG. 14A illustrates an example of a display for viewing the list of the coded streams. The image decoding apparatus 1306 operates in the partial decoding mode for each of the plurality of coded streams, and the preview is displayed in a small display size using the designated tile.

All of the plurality of coded streams is recorded in the flash memory 1304, and each coded stream is encoded using the coding format according to the first, second, third, fourth, fifth, and sixth exemplary embodiments.

When the coded stream list is to be displayed, the memory controller 1305 reads the coded streams from the flash memory 1304 and causes the image decoding apparatus 1306 to operate in the partial decoding mode.

The image processing apparatus 1307 compares the tile division information and the tile number output from the image decoding apparatus 1306 with the display size of the display apparatus 1308. The image processing apparatus 1307 then determines the enlargement or reduction rate and the size of the area to be trimmed, and performs image processing accordingly.

The above-described process is sequentially performed on each coded stream to be used in displaying the coded stream list. The list of a plurality of coded streams can thus be displayed.

If each of the contents is the coded stream of a still image, the preview displays 1402, 1403, 1404, and 1405 are still images. If each of the contents is the coded stream of a moving image, the preview displays 1402, 1403, 1404, and 1405 may be a coded stream moving image or a still image using a specific frame.

The moving image can be used as the preview display by switching between the coded steams and repeatedly performing the above-described process for displaying the coded stream list. The process can be switched by any method, such as after decoding a predetermined number of frames in the coded stream, or after a predetermined time has elapsed.

If the user selects the contents by a touch operation in FIG. 14A, a full-screen display of the entire contents is performed as illustrated in FIG. 14B.

When the full-screen display is to be performed, the memory controller 1305 reads from the flash memory 1304 the selected coded stream, and causes the image decoding apparatus 1306 to operate in the normal decoding mode. The image processing apparatus 1307 then compares the frame size acquired from the image decoding apparatus 1306 with the display size of the display apparatus 1308, and determines the enlargement or reduction rate and the size of the region to be trimmed. The result of the image processing apparatus 1307 is displayed and reproduced on the display apparatus 1308.

If the user then operates on the back instruction unit 1407 by the touch operation when the full-screen display is performed as illustrated in FIG. 14B, the screen returns to the mode for displaying the coded stream list illustrated in FIG. 14A.

According to the present exemplary embodiment, when the user is to select on the coded stream list displayed on the image display system, the preview display is performed using the preview tile. As a result, the important portions of the contents can be enlarged and displayed, so that the user becomes capable of more correctly recognizing the contents. Further, since only the preview tile in the coded stream are decoded and displayed, high-speed displaying can be realized even when displaying the plurality of coded streams.

If the present exemplary embodiment is to be configured by software, a thread may be allocated to each preview so that parallel processing can be performed.

Example 8

Figure 15:
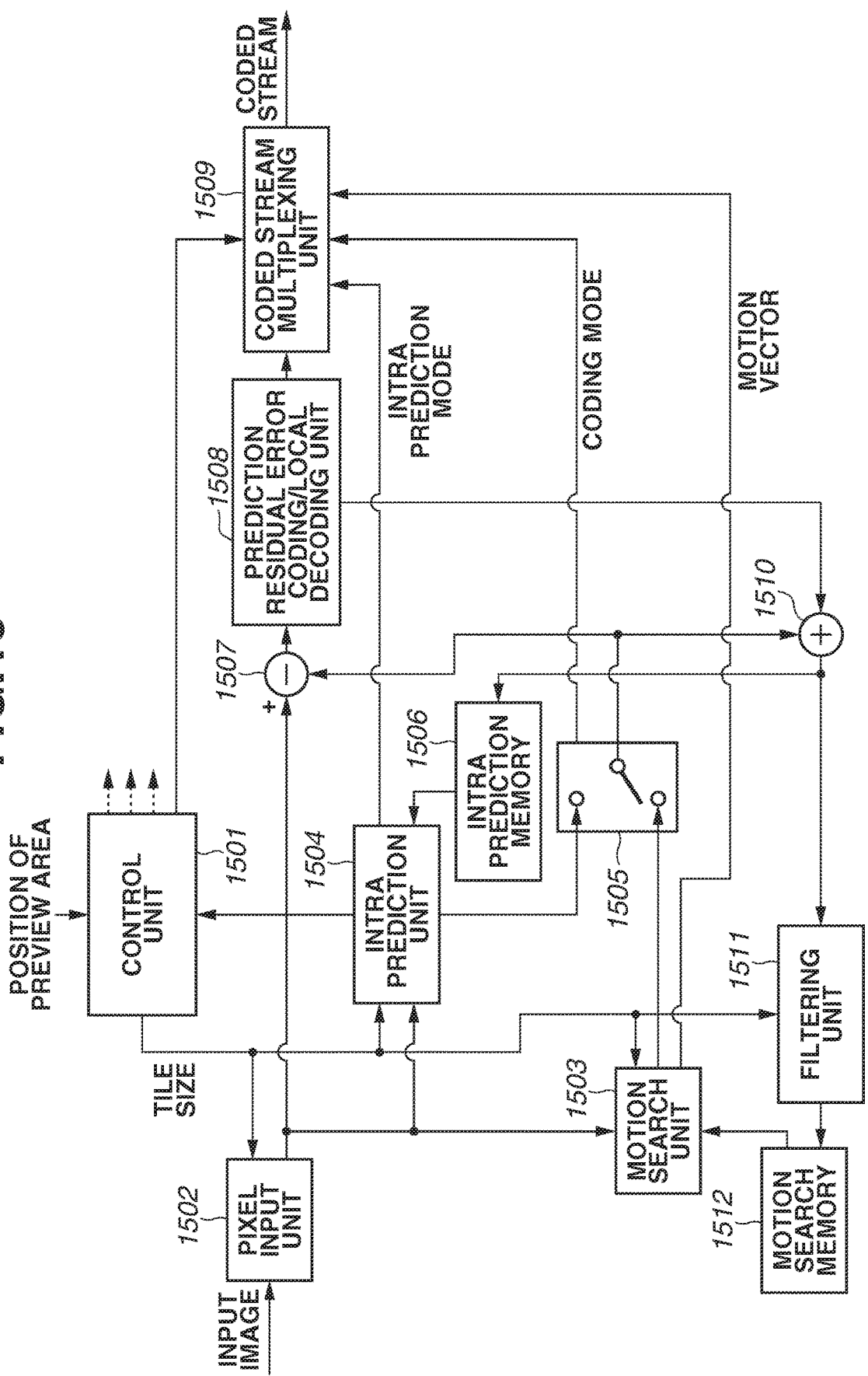
FIG. 15 is a block diagram illustrating an image coding apparatus according to an eighth exemplary embodiment of the present invention.

FIG. 15 illustrates an image coding apparatus which encodes a still image or an image frame in a moving image using the image coding apparatus according to an eighth exemplary embodiment of the present invention.

Referring to FIG. 15, the image coding apparatus includes a control unit 1501, a pixel input unit 1502, a motion search unit 1503, an intra prediction unit 1504, a selection unit 1505, an intra prediction memory 1506, a subtraction unit 1507, a prediction residual error coding/local decoding unit 1508, a coded stream multiplexing unit 1509, an addition unit 1510, a filtering unit 1511, and a motion search memory 1512.

The control unit 1501 receives from outside the image coding apparatus the frame size, the level, the profile, and the coding parameter, and performs each process according to the received content. Further, the control unit 1501 determines the number of tiles and the tile size according to the received frame size.

According to the present exemplary embodiment, tile division is automatically performed inside the image coding apparatus. However, the number of tiles and the tile size may be designated from outside the image coding apparatus.

The coding format including the tile information is of a similar configuration as according to the first exemplary embodiment. The control unit 1501 also receives from the outside, information on an area to be used as the preview. The control unit 1501 compares the preview area information with the tile information, determines the tile numbers to be used as the preview, and generates the tile preview information.

The generated tile preview information is transmitted as a portion of the SEI and along with the other header information to the coded stream multiplexing unit 1509, and multiplexed into the coded stream.

The pixel input unit 1502 reads the input image according to the tile size. The motion search unit 1503 reads the reference image from the motion search memory 1512, generates the reference block and searches for the appropriate motion vector, and determines the motion vector in which an estimated generated code amount becomes the smallest.

The intra prediction unit 1504 reads the reference image from the intra prediction memory 1506, generates the reference block corresponding to the intra prediction mode, and searches for the appropriate intra prediction mode. The intra prediction unit 1504 then determines the intra prediction mode in which the estimated generated code amount becomes the smallest.

The selection unit 1505 compares the estimated code amounts calculated in the intra prediction unit 1504 and the motion search unit 1503, and determines the coding mode indicating either the inter prediction or the intra prediction. Further, the selection unit 1505 selects the reference block generated by either the motion search unit 1503 or the intra prediction unit 1504.

The coding mode may be encoded by entropy coding. The subtraction unit 1507 performs prediction (subtraction) based on the input block and the reference block.

The prediction residual error coding/local decoding unit 1508 performs on the prediction residual error output from the subtraction unit 1507, orthogonal transform, quantization, and entropy coding (i.e., variable-length coding or arithmetic coding). Further, the prediction residual error coding/local decoding unit 1508 performs inverse-quantization and inverse-orthogonal transform on the quantized orthogonal transform coefficients of the prediction error for performing intra prediction or inter prediction on the subsequent blocks. The prediction residual error coding/local decoding unit 1508 thus locally-decodes the prediction error.

The coded stream multiplexing unit 1509 performs multiplexing the coded data of the header information including the tile preview information, the coding mode, the intra prediction mode, the motion vector, and the quantized orthogonal transform coefficients of the prediction error. The coded stream multiplexing unit 1509 outputs the result as the coded stream.

The addition unit 1510 adds the prediction error locally-decoded by the prediction residual error coding/local decoding unit 1508 to the reference block output from the selection unit 1505 (i.e., performs either the motion compensation or the intra compensation).

The pixels decoded by the addition unit 1510 are output to the filtering unit 1511 and recorded in the intra prediction memory 1506 for performing intra prediction of the subsequent blocks.

The filtering unit 1511 performs filtering using the de-blocking filter on the decoded block. The decoded image on which filtering has been performed is recorded in the motion search memory 1512.

According to the present exemplary embodiment, the area information to be used for the preview is designated by the user operating on the user interface of an imaging apparatus such as the digital camera.

Figure 16:
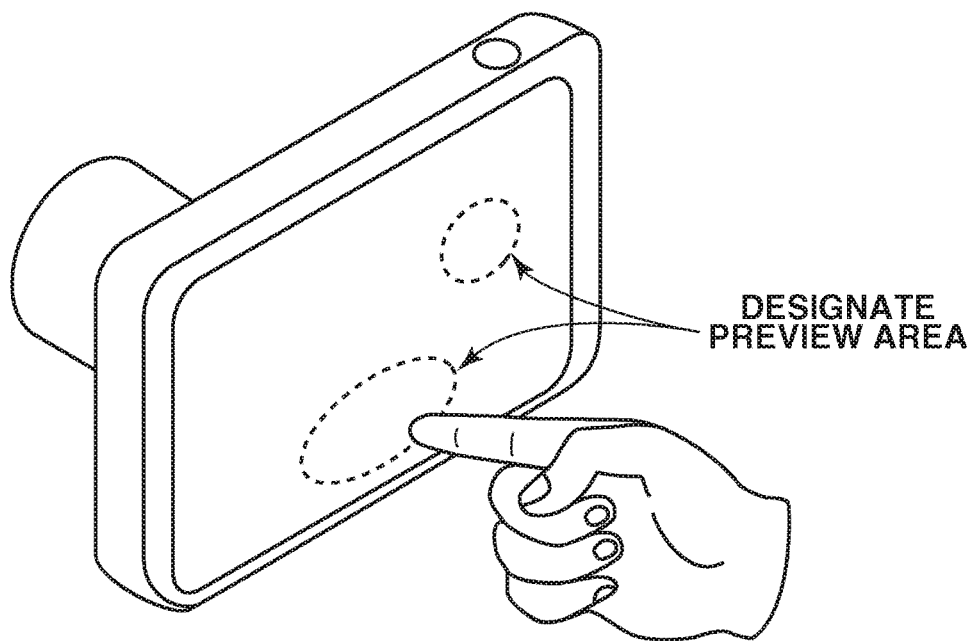
FIG. 16 illustrates a state where a user designates a preview tile according to the eighth exemplary embodiment.

FIG. 16 illustrates the user designating the preview area information on a touch panel display of the digital camera.

Referring to FIG. 16, the user designates the area appropriate as the preview, such as the area in which the main object is captured (i.e., the area surrounded by circles on the touch panel illustrated in FIG. 16). The user then captures the moving image or the still image. The present exemplary embodiment is not limited to operating on the touch panel, and the user may designate using a key operation or by using the result of face recognition.

Further, the user may designate the preview area information after capturing the moving image or the still image. In such a case, the user designates the preview area while reproducing the captured image on the digital camera. The tile preview information corresponding to the preview area designated by the user is then added to the SEI in the coded stream.

According to the present exemplary embodiment, the image coding apparatus is not limited to a specific tile division method. Further, the number of tiles and the tile preview information in the tile preview information are not dependent on a specific shape. Furthermore, the insertion position thereof is not limited to the SEI, and the tile preview information may be inserted as the VUI or the user data.

The coded stream generation process according to the third exemplary embodiment can be realized by generating the SEI using the tile coordinates as the tile preview information and performing multiplexing.

Further, the coded stream generation process according to the fourth exemplary embodiment can be realized by the coded stream multiplexing unit 1509 buffering the coded data of each tile, and multiplexing the coded data of the preview tile before the other tiles.

Furthermore, the interface as illustrated in FIG. 16 on which the user can set a plurality of preview areas can be provided, and the information is then input to the control unit 1501. As a result, the priority level is set for each area, so that the coded stream generation process according to the fifth exemplary embodiment, which inserts in the SEI the plurality of tile preview information to which the priority levels are added, can be realized. Such a priority level may employ the order in which the user has designated the area. However, it is not dependent on a specific method.

Further, the offset information to the coded data of the preview tile may be included as the tile preview information, similarly as in the sixth exemplary embodiment.

Furthermore, according to the present exemplary embodiment, it is desirable for the image coding apparatus to perform coding without dependency between the tiles (i.e., tile_boundary_independence_idc=1) as described in the first exemplary embodiment. However, it is not limited thereto.

As described above, the user explicitly designates the area to be used as the preview when capturing the image, so that the preview content of the generated coded stream can be determined as desired by the user. Further, the present invention can be applied to both the still image and the moving image.

Similarly as in the exemplary embodiments above, creation of ROI tile can be easily realized as the same manner as preview tile in the present exemplary embodiment. Each preview tile or ROI tile can be comprised of a plurality of tiles. Also a plurality of preview tiles or ROI tiles can be included in the image similarly as exemplary embodiments above.

Figure 17:
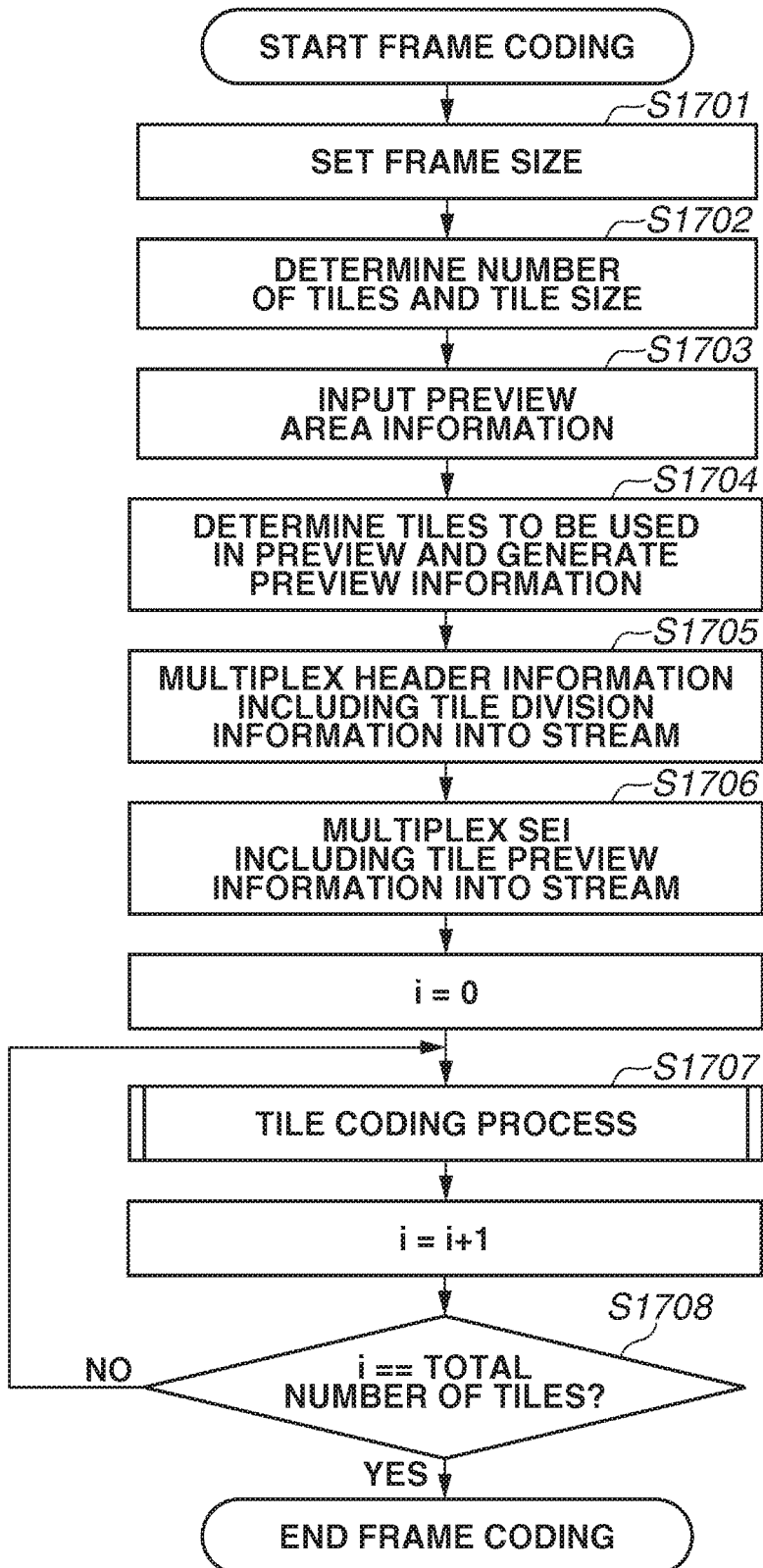
FIG. 17 is a flowchart illustrating a process for encoding each frame according to a ninth exemplary embodiment of the present invention.
Figure 18:
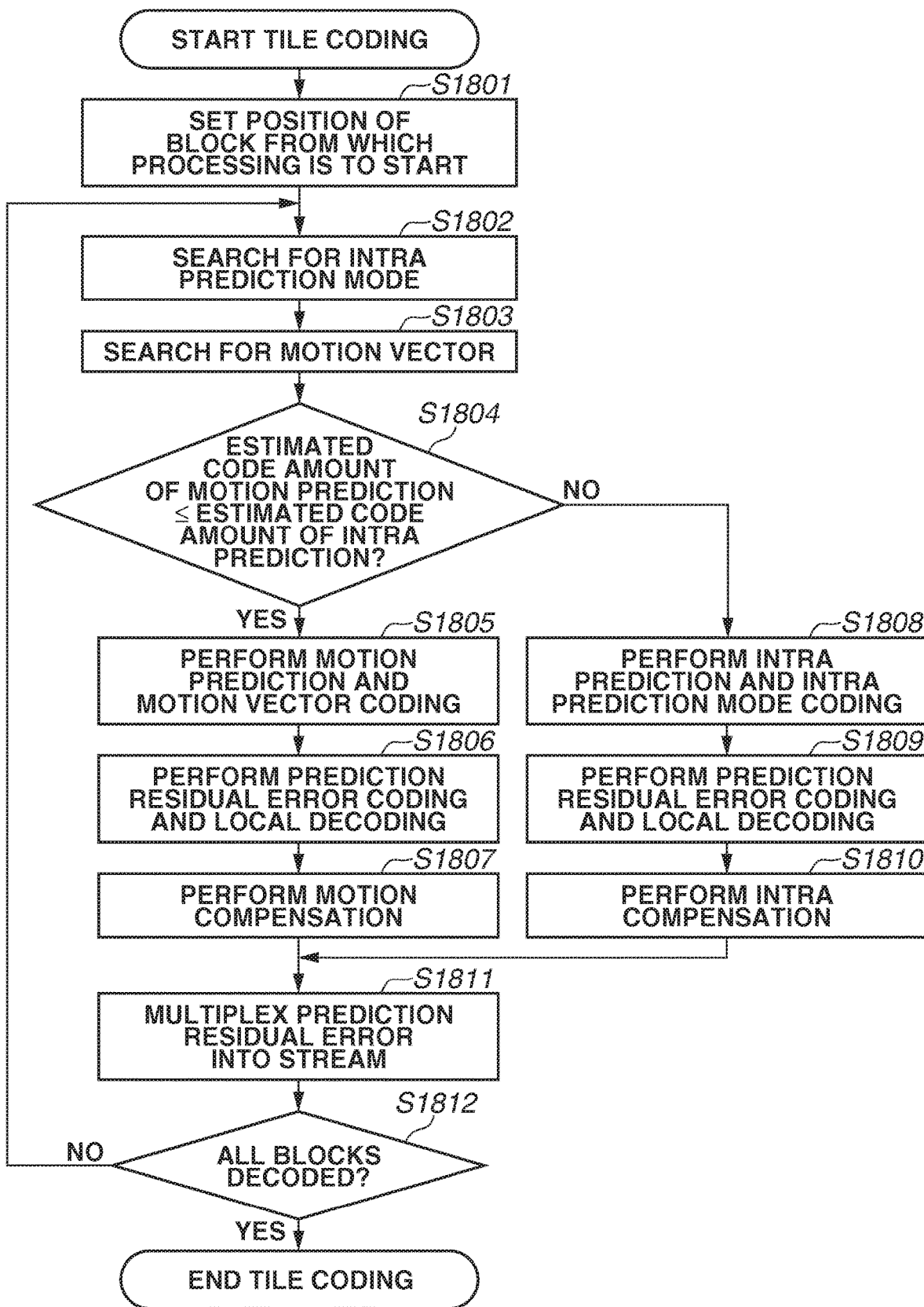
FIG. 18 is a flowchart illustrating a process for encoding each tile according to the ninth exemplary embodiment.

The image coding apparatus according to the eighth exemplary embodiment may be realized as a software program running on the CPU. FIGS. 17 and 18 are flowcharts illustrating a program for coding 1 frame according to a ninth exemplary embodiment.

In step S1701, the CPU sets from outside the program the frame size to be coded. In step S1702, the CPU calculates the tile division information including the number of tiles in the image data and the tile size according to the frame size acquired in step S1701.

In step S1703, the CPU sets from outside the program the area information to be used for the preview. In step S1704, the CPU compares the tile division information determined in step S1702 with the preview area information set in step S1703, and determines the tiles to be used as the preview tile. The CPU then generates the tile preview information using the tile number or the position information of the determined tile.

In step S1705, the CPU multiplexes into the coded stream as the SPS, the header information including the coding parameters set in step S1701 and step S1702, and the tile division information calculated in step S1703.

In step S1706, the CPU multiplexes into the coded stream as the SEI, the tile preview information generated in step S1704. In step S1707 and step S1708, the CPU performs tile division based on the tile division information calculated in step S1702. The CPU then encodes all the tiles in the frame.

FIG. 18 is a flowchart illustrating the coding process for each tile illustrated in step S1707 in FIG. 17.

In step S1801, the CPU calculates the position of the block from which the process is to be started, from the tile division information calculated in step S1702 and the tile number of the block to be coded. In step S1802, the CPU searches for the intra prediction mode of each block, and estimates the generated code amount from the prediction residual error.

In step S1803, the CPU searches for the motion vector in each block in the tile, and estimates the generated code amount from the prediction residual error. If the frame to be processed is the intra coding frame, the process of step S1803 is omitted.

In step S1804, the CPU compares the estimated code amount of inter prediction with the estimated code amount of intra prediction. The CPU then performs inter prediction in step S1805 and the subsequent steps, or intra prediction in step S1808 and the subsequent steps, according to the coding mode acquired as the comparison result.

In step S1805, the CPU performs the motion prediction using the motion vector found by search in step S1803. Further, the CPU encodes that the coding mode is the inter prediction mode, encodes the motion vector found by search, and multiplexes into the coded stream.

In step S1806, the CPU generates the coded data and locally-decodes the prediction residual error similarly as the prediction residual error coding/local decoding unit 1508 according to the eighth exemplary embodiment. In step S1807, the CPU performs motion compensation on the prediction residual error which has been locally-decoded.

In step S1808, the CPU performs intra prediction using the intra prediction mode found by search in step S1802. Further, the CPU encodes the information indicating that the coding mode found by search is the intra prediction mode and the intra prediction mode, and multiplexes into the coded stream.

In step S1809, the CPU generates the coded data and locally-decodes the prediction residual error similarly as in step S1806. In step S1810, the CPU performs intra compensation on the prediction residual error which has been locally-decoded.

In step S1811, the CPU multiplexes the coded prediction residual error into the coded stream. The CPU also multiplexes into the coded stream the motion vector or the intra prediction mode.

In step S1812, the CPU determines whether coding of all blocks in the tile have been completed. If coding of all blocks in the tile have been completed (YES in step S1812), tile coding ends.

As described above, a similar result as acquired according to the eighth exemplary embodiment can be acquired when the image coding process is realized by the program.

Further, the present exemplary embodiment is not limited to specific tile division information and content of the tile preview information, and the insertion position in the coded stream, similarly as in the eighth exemplary embodiment. The present exemplary embodiment can thus use the coding format according to the first, second, third, fourth, fifth, and sixth exemplary embodiments. Further, the present invention can be applied to both the still image and the moving image.

In step S1707 illustrated in FIG. 17, the CPU may buffer the coded stream of each tile, and output the data of the preview tile first after performing step S1708. Further, in step S1703, the CPU may set the priority level on each tile in the SEI by setting an order of priority on each of the area information.

Similarly as in the exemplary embodiments above, creation of ROI tile can be easily realized as the same manner as preview tile in the present exemplary embodiment. Each preview tile or ROI tile can be comprised of a plurality of tiles. Also a plurality of preview tiles or ROI tiles can be included in the image similarly as in the exemplary embodiments above.

Example 9

The present invention can be realized by supplying to a system a storage medium on which a program code that implements the functions of the above-described exemplary embodiments, and the system reading and executing the program code. In such a case, the program code read from the storage medium also implements the functions of the above-described exemplary embodiments, and the storage medium storing the program code constitutes the present invention. Further, an operating system (OS) running on the computer may perform all or a part of the actual processing so that the functions of the above-described exemplary embodiments can be implemented by this processing.

Furthermore, the present invention may be realized as follows. The program code read from the storage medium is written to a function expansion board inserted into the computer or to a memory provided in a function expansion unit connected to the computer. A CPU mounted on the function expansion board or the function expansion unit then performs all or a part of the actual processing so that the functions of the above-described embodiments can be implemented.

If the present invention is to be applied to the storage medium, the storage medium stores the program code corresponding to the above-described flowcharts.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

The invention claimed is:

1. An image decoding method for decoding a plurality of encoded image frames in an encoded stream, each of the image frames being divided into a plurality of tiles, the plurality of image frames being encoded tile by tile, the image decoding method comprising:

acquiring, from a parameter set in the encoded stream for the plurality of encoded image frames, division information including a number of columns of tiles and a number of rows of tiles in the plurality of encoded image frames;

acquiring, from supplemental enhancement information (SEI) in the encoded stream for the plurality of encoded image frames, information indicating that a predetermined tile set including at least one tile is intended for a display, and position information of a predetermined tile set for a display of a corresponding image portion in each of the plurality of image frames, the position information of the predetermined tile set including a first tile position of a first tile including top-left corner of the predetermined tile set and a second tile position of a second tile including a bottom-right corner of the predetermined tile set; and decoding encoded image frames in the encoded stream using the division information including a number of columns of tiles and a number of rows of tiles, wherein, when the image portion in the predetermined tile set corresponding to the position information acquired from the supplemental enhancement information (SEI) is reproduced for a display in accordance with the information indicating that a predetermined tile set including at least one tile is intended for a display, the predetermined tile set corresponding to the position information acquired from the supplemental enhancement information (SEI) is decoded with motion compensation by referring to a tile in a reference image frame at a corresponding position of the tile in the predetermined tile set without referring to any tiles in the reference image frame at positions different from the corresponding position of the predetermined tile set, and wherein each of the plurality of tiles has a rectangular shape.

* * * * *